(12) United States Patent
Yamaguchi et al.

(10) Patent No.: US 10,419,230 B2
(45) Date of Patent: Sep. 17, 2019

(54) ELECTRONIC APPARATUS AND METHOD

(71) Applicant: TOSHIBA CLIENT SOLUTIONS CO., LTD., Koto-Ku, Tokyo (JP)

(72) Inventors: Tatsuo Yamaguchi, Tokyo (JP); Toshiyuki Yamagami, Tokyo (JP)

(73) Assignee: TOSHIBA CLIENT SOLUTIONS CO., LTD., Tokyo (JP)

( * ) Notice: Subject to any disclaimer, the term of this patent is extended or adjusted under 35 U.S.C. 154(b) by 532 days.

(21) Appl. No.: 15/040,798

(22) Filed: Feb. 10, 2016

(65) Prior Publication Data

US 2017/0063942 A1 Mar. 2, 2017

(30) Foreign Application Priority Data

Aug. 25, 2015 (JP) .................. 2015-165824

(51) Int. Cl.
*H04L 12/18* (2006.01)
*H04L 29/06* (2006.01)

(52) U.S. Cl.
CPC ...... *H04L 12/1822* (2013.01); *H04L 65/1086* (2013.01); *H04L 65/403* (2013.01); *H04L 65/4015* (2013.01)

(58) Field of Classification Search
USPC .................................. 709/205, 223, 200
See application file for complete search history.

(56) References Cited

U.S. PATENT DOCUMENTS

| | | | | |
|---|---|---|---|---|
| 9,851,895 B2 * | 12/2017 | Hwang | ............... | G06F 3/04883 |
| 2004/0237033 A1 * | 11/2004 | Woolf | .................. | G06F 17/242 |
| | | | | 715/211 |
| 2005/0171783 A1 * | 8/2005 | Suominen | ............... | G10L 15/22 |
| | | | | 704/276 |
| 2010/0067674 A1 * | 3/2010 | Lee | ..................... | G06F 3/03545 |
| | | | | 379/100.01 |
| 2013/0271403 A1 * | 10/2013 | Nagahara | ............ | H04L 12/1813 |
| | | | | 345/173 |
| 2014/0028617 A1 * | 1/2014 | Kim | ...................... | G06F 3/1454 |
| | | | | 345/174 |
| 2014/0334732 A1 * | 11/2014 | Jung | ................... | G06F 3/04883 |
| | | | | 382/188 |
| 2015/0205520 A1 * | 7/2015 | Yim | ..................... | G06F 3/0484 |
| | | | | 715/268 |
| 2016/0315996 A1 * | 10/2016 | Ha | ........................ | H04L 67/025 |

FOREIGN PATENT DOCUMENTS

| | | |
|---|---|---|
| JP | 2005-100030 | 4/2005 |
| JP | 2006-303742 | 2/2006 |
| JP | 2013-097749 | 5/2013 |

* cited by examiner

*Primary Examiner* — El Hadji M Sall
(74) *Attorney, Agent, or Firm* — Rutan & Tucker, LLP

(57) ABSTRACT

According to one embodiment, an electronic apparatus includes a transceiver and a hardware processor. The transceiver receives first handwriting shared in a first group according to a first scheme. The first group includes a first electronic apparatus and a second electronic apparatus. The first handwriting includes handwriting made on the first electronic apparatus and handwriting made on the second electronic apparatus. The hardware processor reads first data to be shared in the first group, makes a third group including the electronic apparatus and the first electronic apparatus, and shares the first data in the third group according to a third scheme by transmitting the first data to the first electronic apparatus from the transceiver.

16 Claims, 32 Drawing Sheets

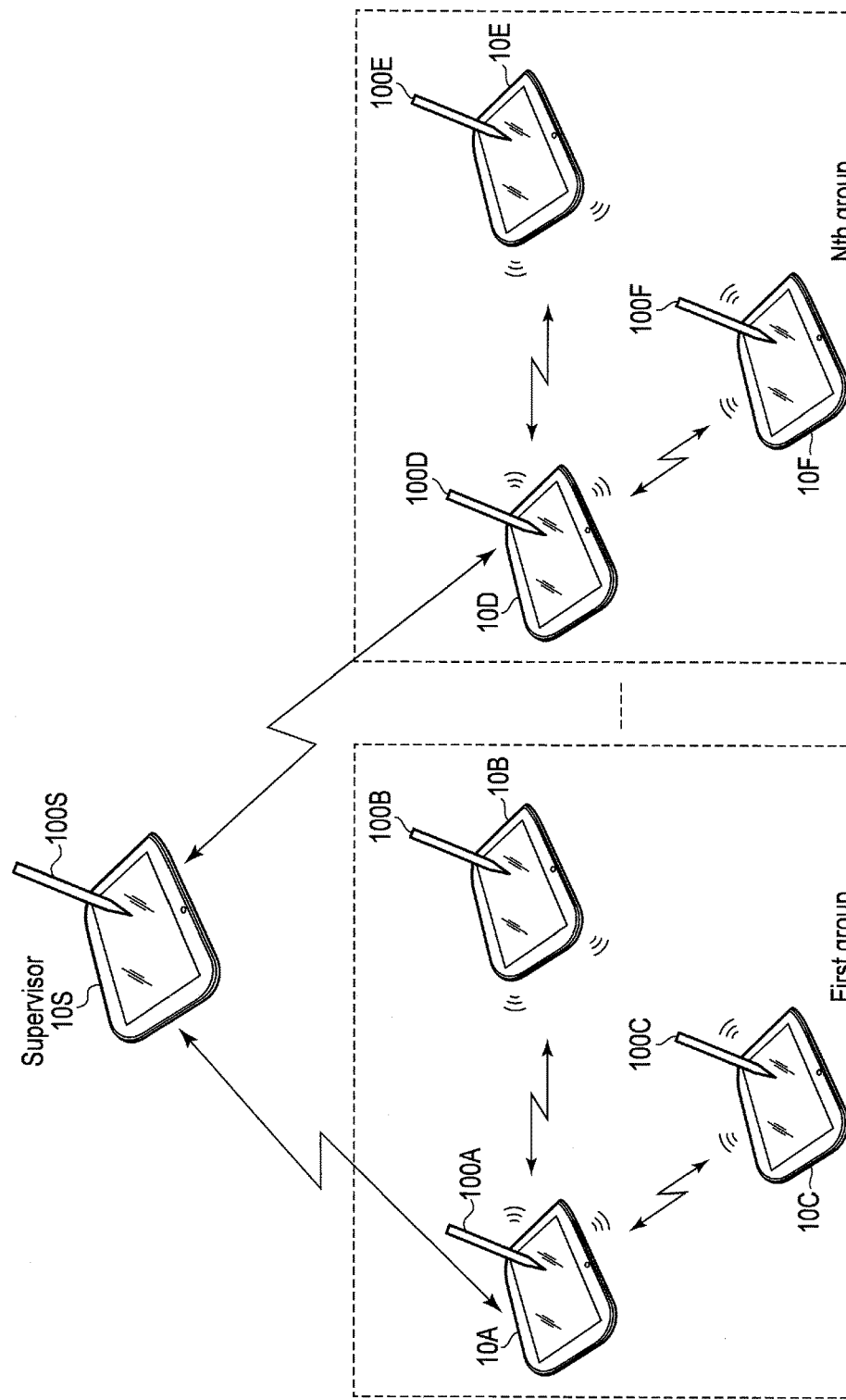
F I G. 3

| Stroke | Writer |
|---|---|
| ◯ | User A |
| ↯ | User B |
| abcd | User C |

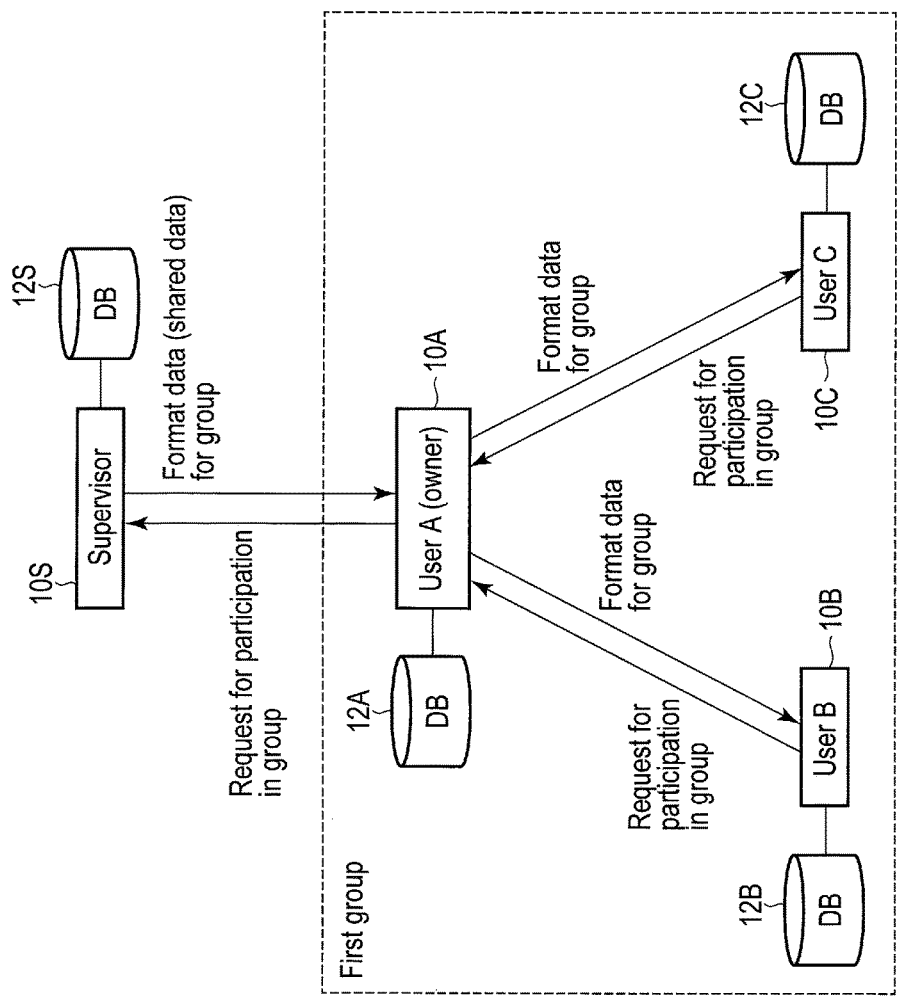
F I G. 9

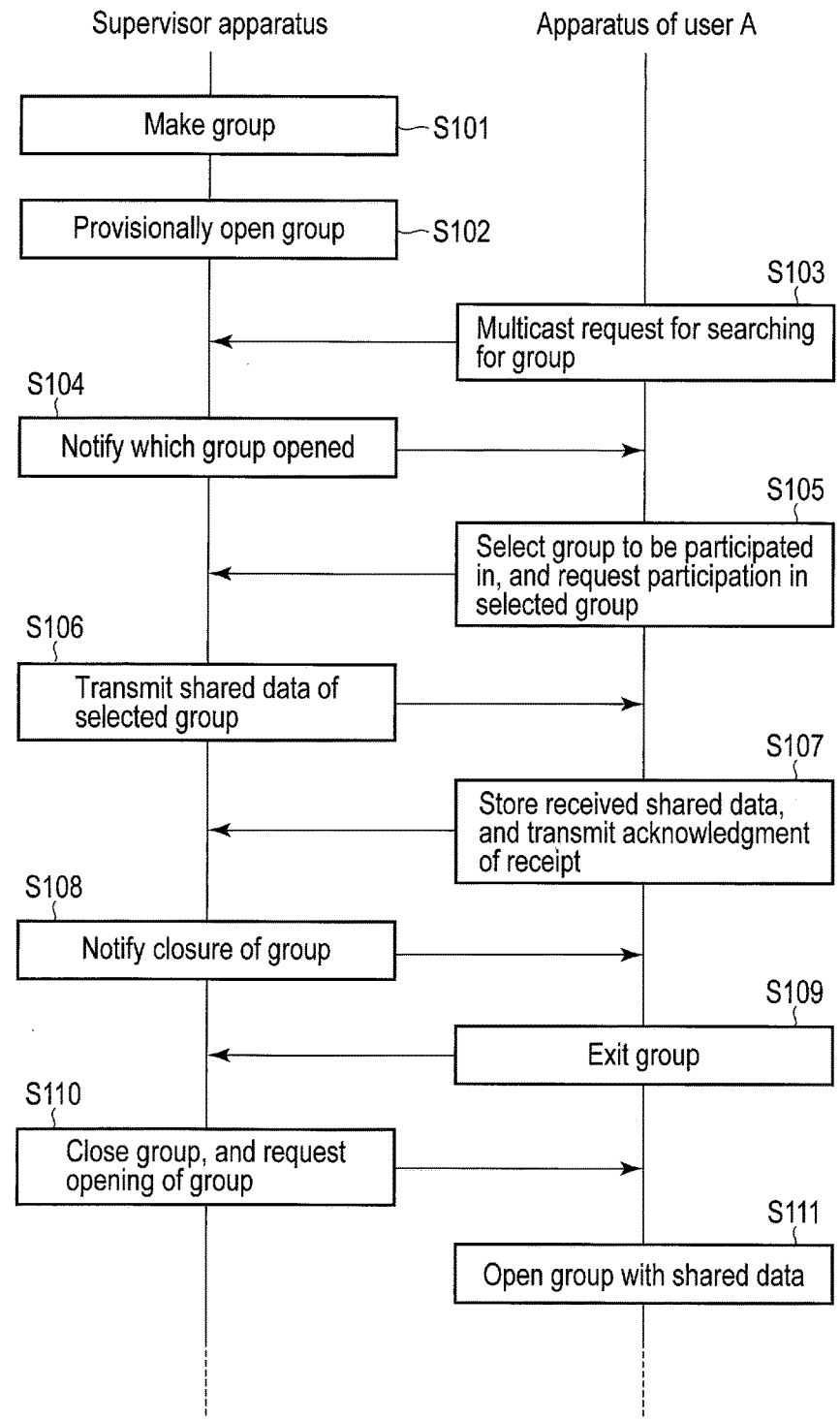
F I G. 10

| Group ID | Group name | Owner ID | Participant ID | State | Thumbnail image | ... |
|---|---|---|---|---|---|---|
| ... | ... | ... | ... | ... | ... | ... |
| ... | ... | ... | ... | ... | ... | ... |
| ⋮ | ⋮ | ⋮ | ⋮ | ⋮ | ⋮ | ⋮ |

F I G. 22

| Stroke ID | User ID | Stroke data | Time | Pen type | Color | Width | Degree of transparency |
|---|---|---|---|---|---|---|---|
| 1 | A | (30,20),(30,25)... | 00:10 | Pencil | Black | ⋮ | ⋮ |
| 2 | A | (48,50),(50,55)... | 00:15 | Pencil | Black | ⋮ | ⋮ |
| 3 | B | (50,15),(55,15)... | 00:20 | Ballpoint pen | Black | ⋮ | ⋮ |
| 4 | C | (50,45),(55,50)... | 00:30 | Ballpoint pen | Red | ⋮ | ⋮ |
| ... | ... | ... | ... | ... | ... | ... | ... |
| 100 | C | (75,50),(80,48)... | 00:35 | Ballpoint pen | Blue | ⋮ | ⋮ |
| 101 | C | (80,70),(65,60)... | 00:40 | Ballpoint pen | Blue | ⋮ | ⋮ |
| 102 | B | (10,15),(35,15)... | 00:40 | Ballpoint pen | Red | ⋮ | ⋮ |
| ... | ... | | | ... | ... | ... | ... |

F I G. 23

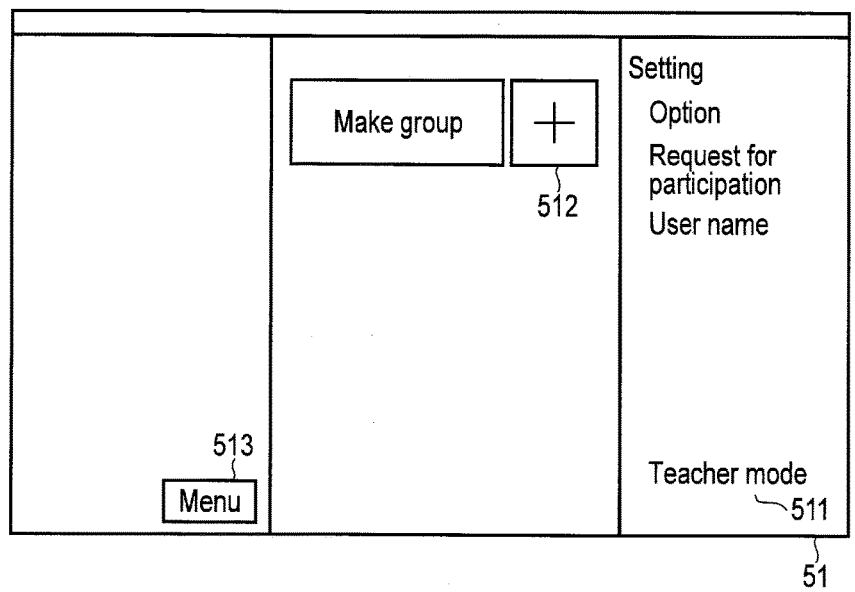
F I G. 24
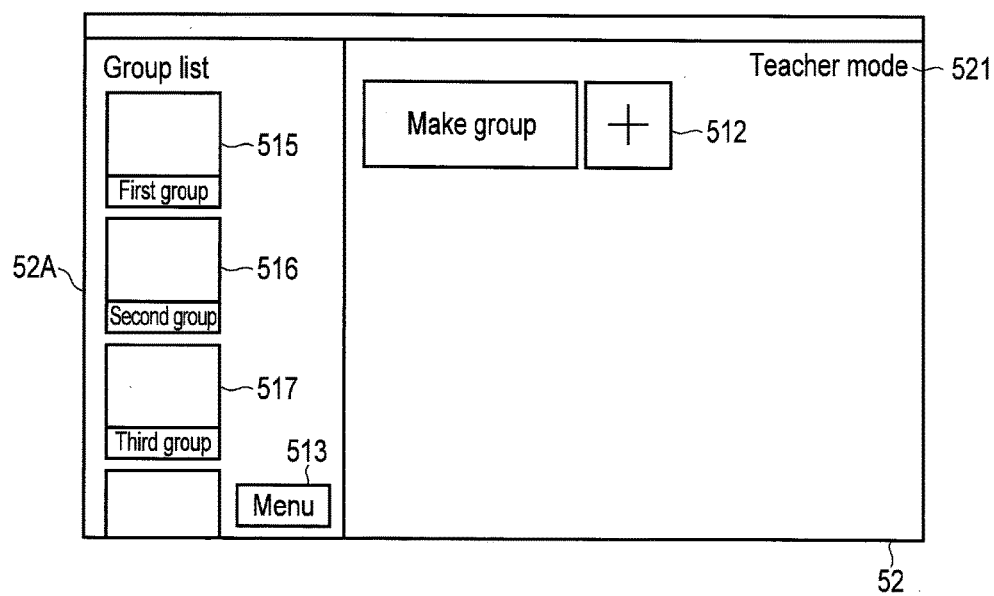
F I G. 25

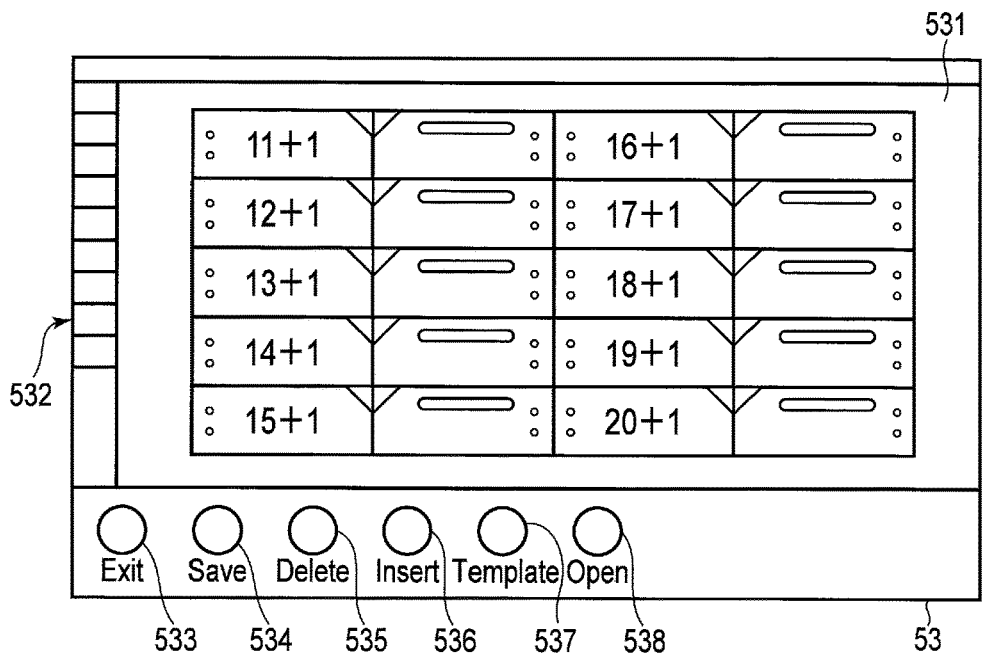
F I G. 26
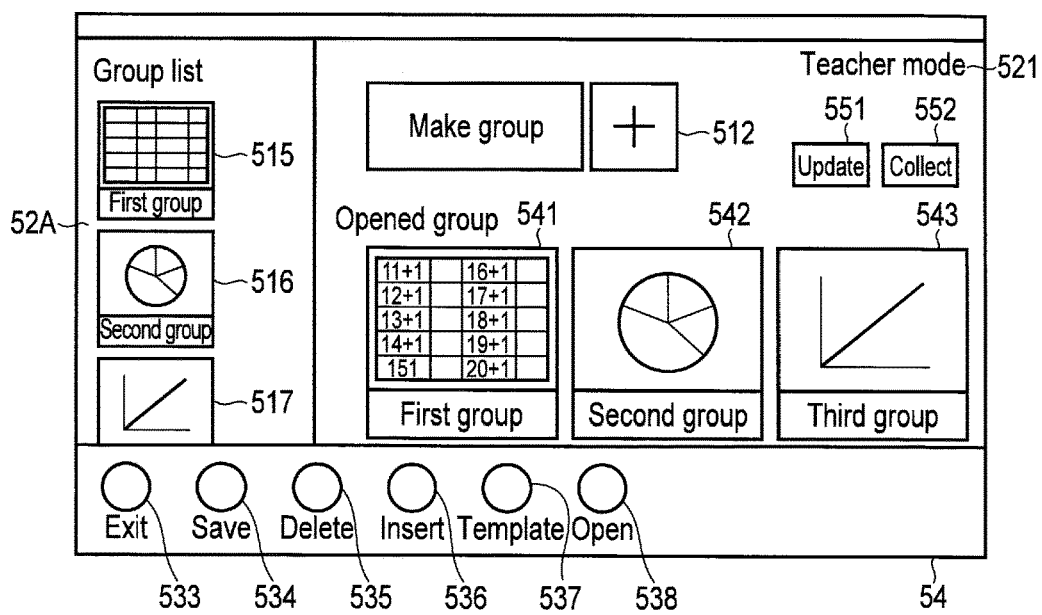
F I G. 27

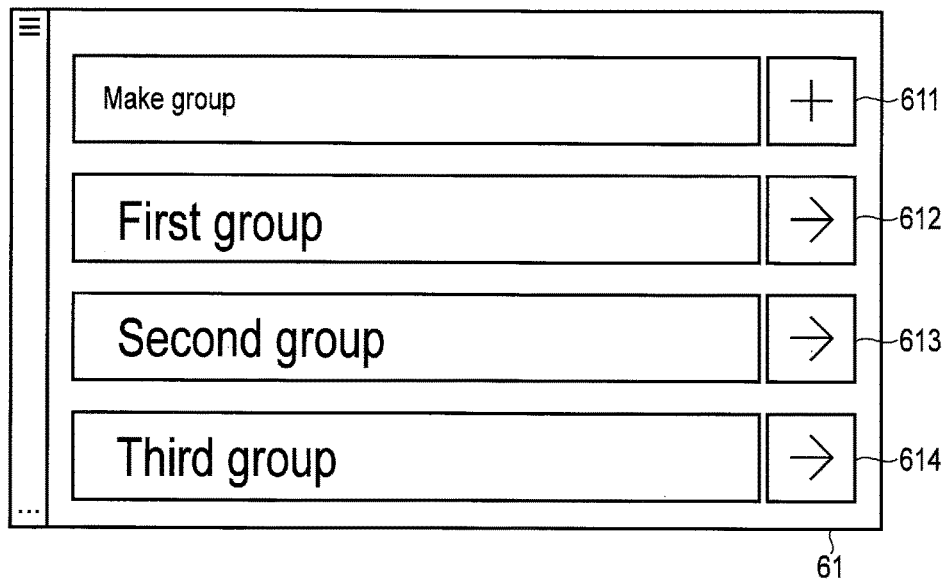
F I G. 28
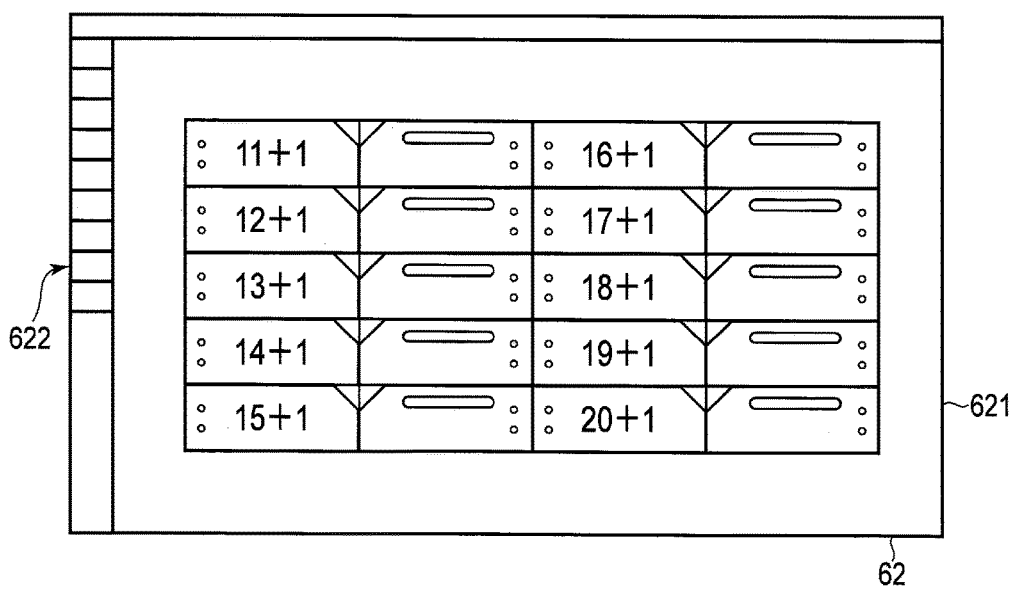
F I G. 29

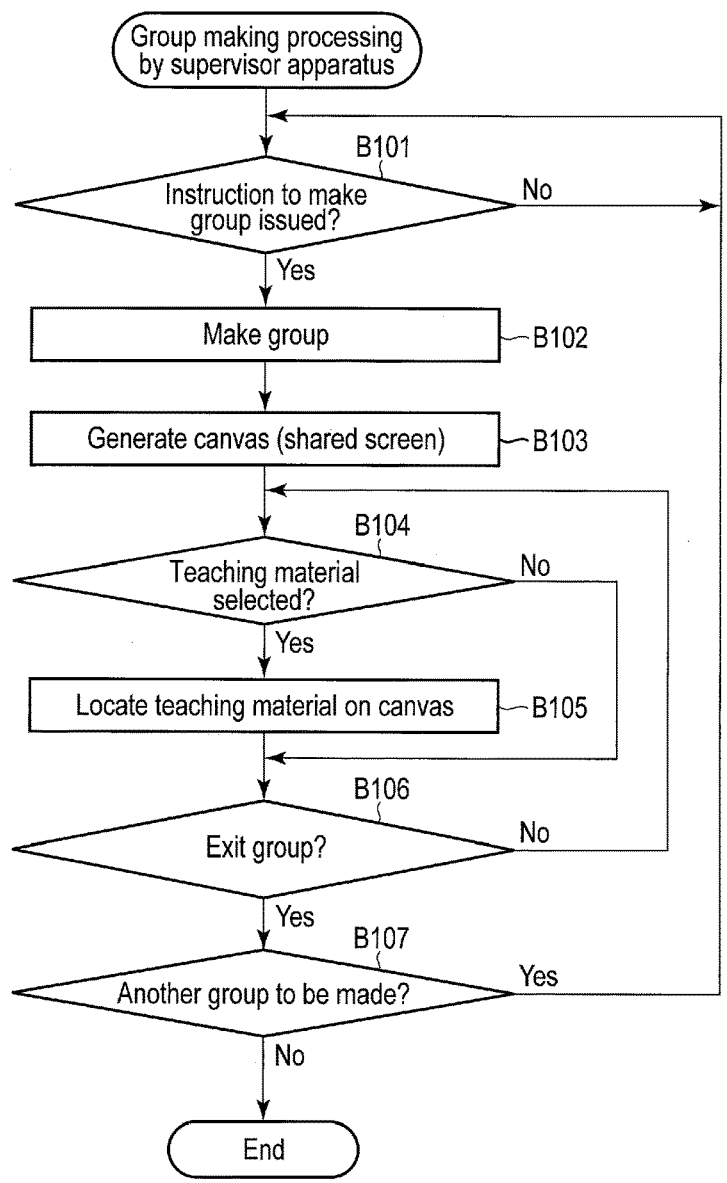
F I G. 30

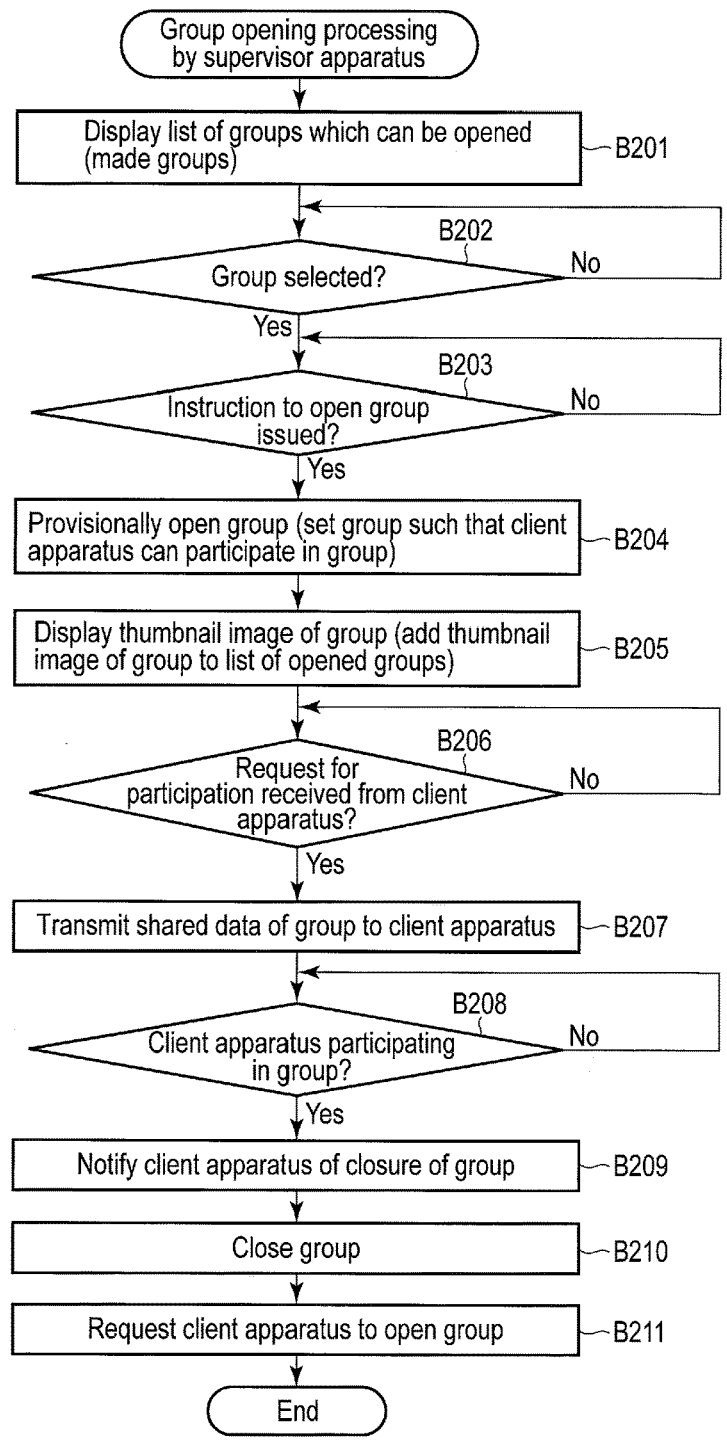
F I G. 31

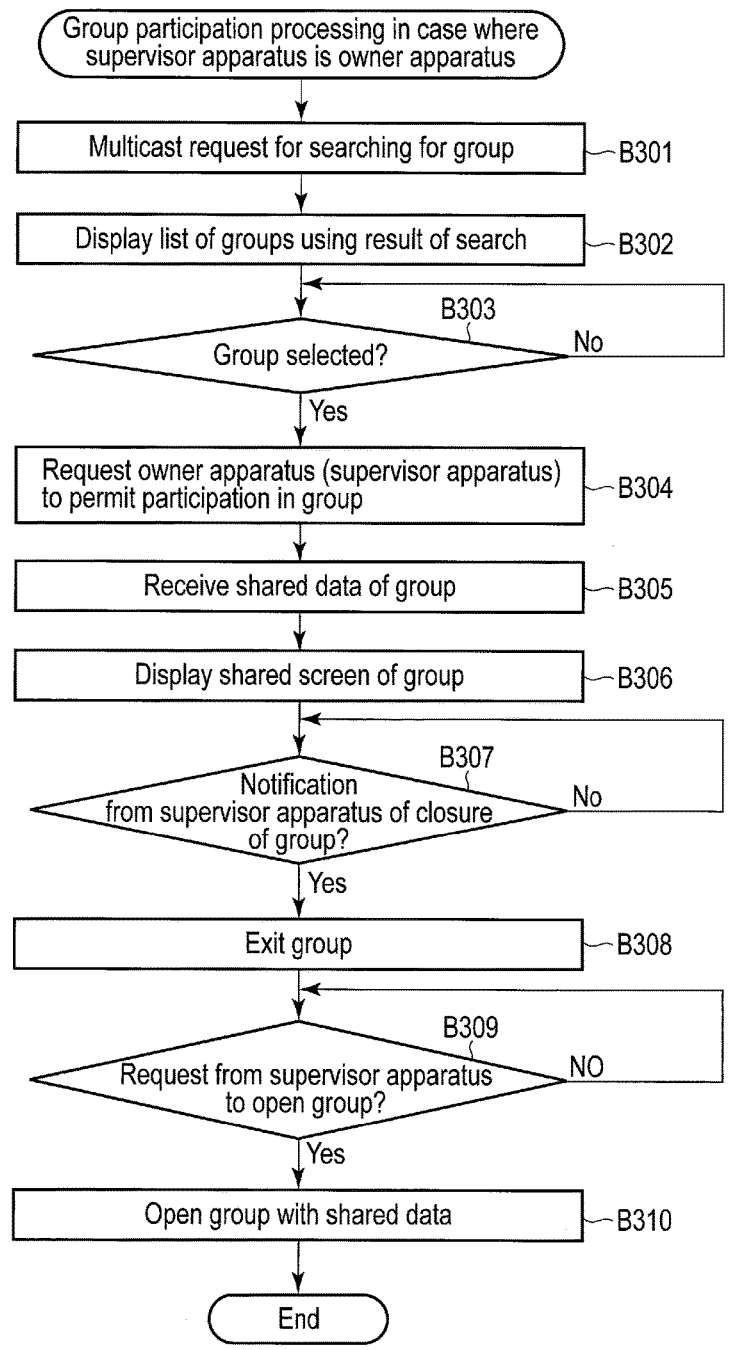
F I G. 32

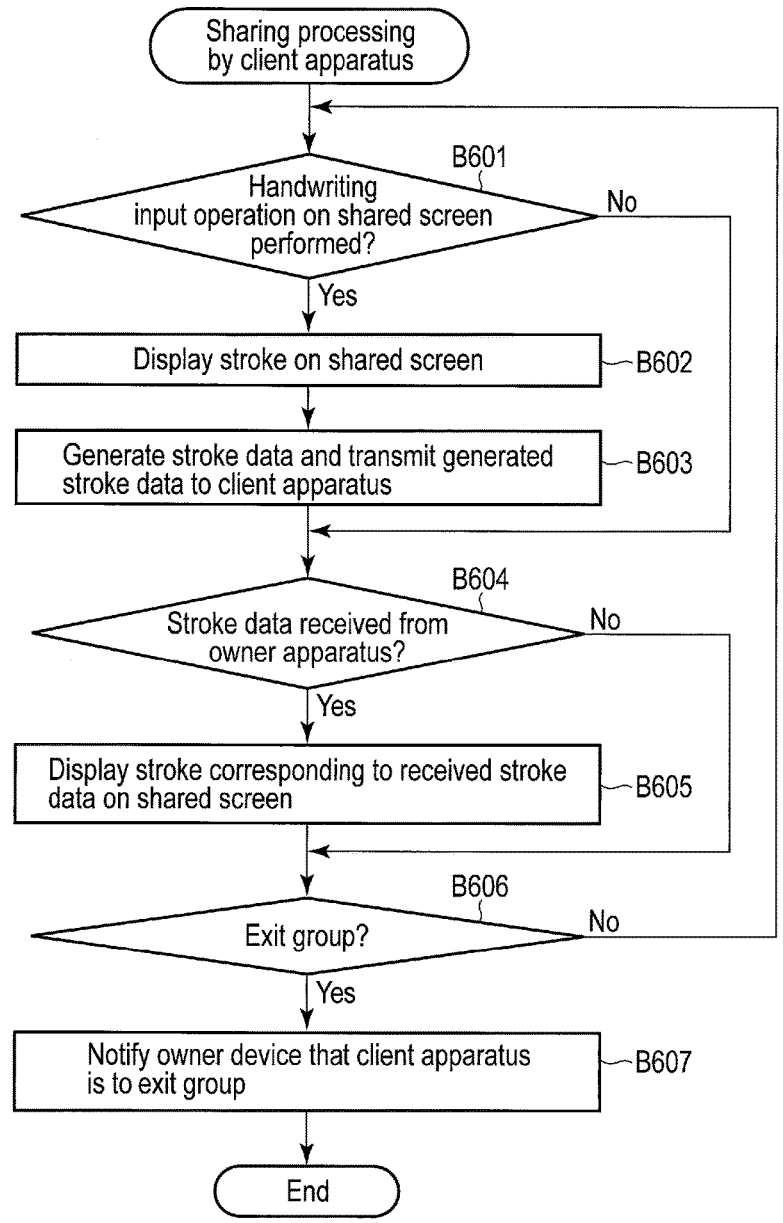
F I G. 35

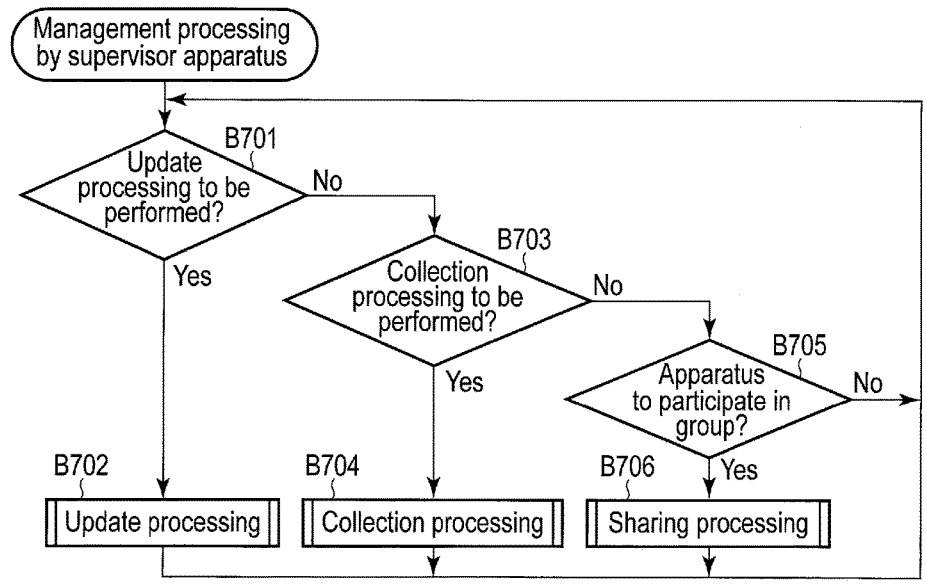
F I G. 36
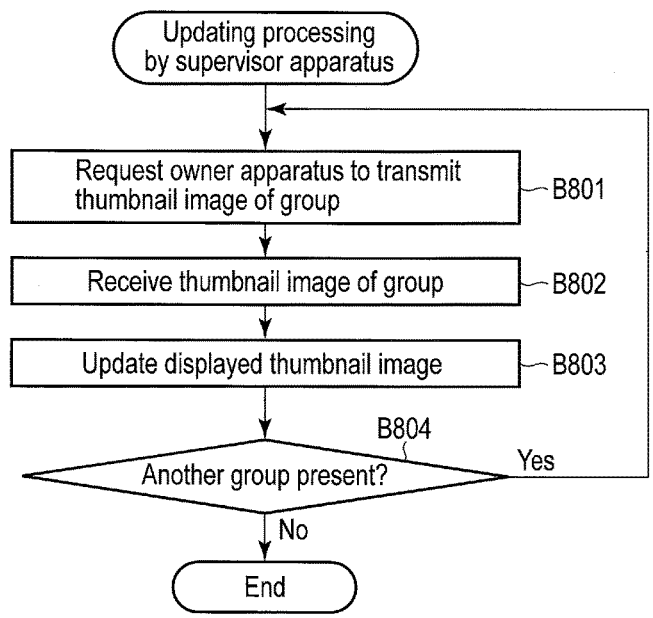
F I G. 37

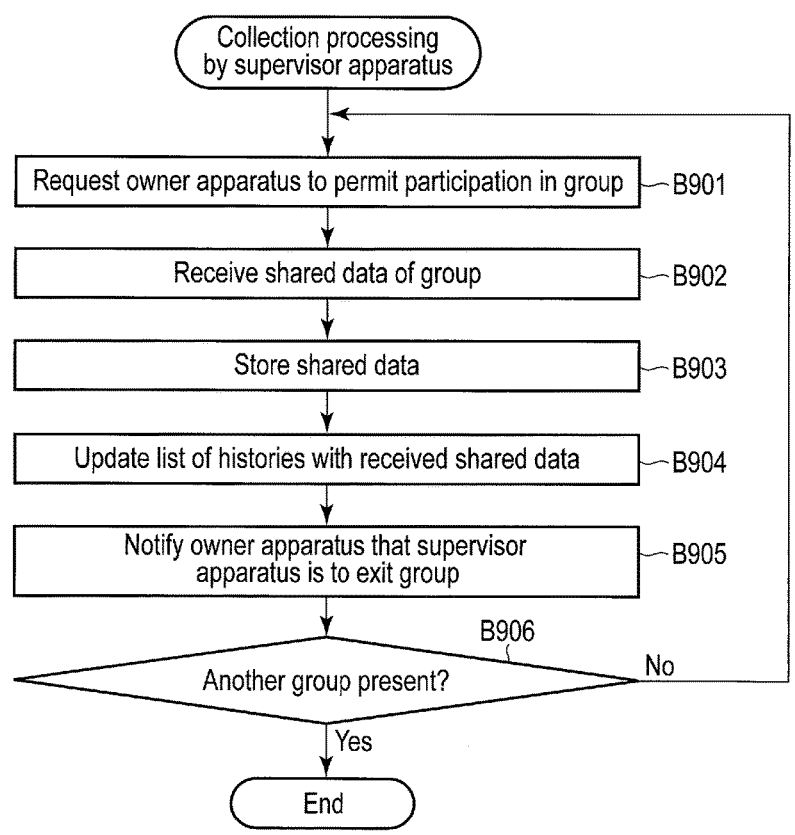
F I G. 38

ELECTRONIC APPARATUS AND METHOD

CROSS REFERENCE TO RELATED APPLICATIONS

This application is based upon and claims the benefit of priority from Japanese Patent Application No. 2015-165824, filed Aug. 25, 2015, the entire contents of which are incorporated herein by reference.

FIELD

Embodiments described herein relate generally to a technique for sharing handwritten information.

BACKGROUND

In recent years, various kinds of electronic apparatuses such as personal computers (PCs), tablets and smartphones have been developed.

Most of those kinds of electronic apparatuses include touch-screen displays to allow users to easily perform an input operation.

Also, in recent years, techniques of handwritten information to be shared have been developed. Those techniques are useful to an educational field, for example, a glass; and business, for example, a conference.

However, conventional techniques are applied on the assumption that a group of computers sharing handwritten information is managed by a given computer belonging to the group. That is, the user of the computer needs to manage the group. However, there is a case where the user is a child or a person unfamiliar with a computer, and thus cannot manage the group. Thus, it is necessary to provide a new technique for also enabling a group sharing handwritten information to be managed from the outside of the group.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a view showing an example of the connection between the electronic apparatus of the embodiment and user apparatuses utilizing the handwriting sharing service.

FIG. 9 is an exemplary view for explaining an outline of the data flow between the user apparatuses and the electronic apparatus of the embodiment at the time of starting the handwriting sharing service.

FIG. 10 is a view for explaining an example of the procedure of processing for starting the handwriting sharing service with the user apparatuses and the electronic apparatus of the embodiment.

FIG. 22 is a view showing a configuration example of group data to be used by the electronic apparatus of the embodiment.

FIG. 23 is a view showing a configuration example of group shared data to be used by the electronic apparatus of the embodiment.

FIG. 24 is a view showing an example of a group making screen, which includes a change button for changing to a supervisor mode (teacher mode), displayed by the electronic apparatus of the embodiment.

FIG. 25 is a view showing an example of a group making screen in the supervisor mode displayed by the electronic apparatus of the embodiment.

FIG. 26 is a view showing an example of a shared screen during making of a group displayed by the electronic apparatus of the embodiment.

FIG. 27 is a view showing an example of a group management screen displayed by the electronic apparatus of the embodiment.

FIG. 28 is a view showing an example of a group selection screen displayed by a user apparatus using handwriting sharing service.

FIG. 29 is a view showing an example of a shared screen displayed by the user apparatus using the handwriting sharing service.

FIG. 30 is a flowchart showing an example of the procedure of group making processing to be executed by the electronic apparatus of the embodiment.

FIG. 31 is a flowchart showing an example of the procedure of group opening processing to be executed by the electronic apparatus of the embodiment.

FIG. 32 is a flowchart showing an example of the procedure of group participation processing to be executed by the user apparatus using the handwriting sharing service in the case where the electronic apparatus of the embodiment is an owner.

FIG. 35 is a flowchart showing an example of the procedure of the sharing processing to be executed by a user apparatus in the case where the user apparatus is a client.

FIG. 36 is a flowchart showing an example of the procedure of group management processing to be executed by the electronic apparatus of the embodiment.

FIG. 37 is a flowchart showing an example of the procedure of updating processing to be executed by the electronic apparatus of the embodiment.

FIG. 38 is a flowchart showing an example of the procedure of collection processing to be executed by the electronic apparatus of the embodiment.

DETAILED DESCRIPTION

Various embodiments will be described hereinafter with reference to the accompanying drawings.

In general, according to one embodiment, an electronic apparatus includes a transceiver, a screen, and a hardware processor. The transceiver is configured to receive first handwriting shared in a first group according to a first scheme and second handwriting shared in a second group according to a second scheme. The first group includes a first electronic apparatus and a second electronic apparatus. The second group includes a third electronic apparatus and a fourth electronic apparatus. The first handwriting includes handwriting made on the first electronic apparatus and handwriting made on the second electronic apparatus. The second handwriting includes handwriting made on the third electronic apparatus and handwriting made on the fourth electronic apparatus. The screen is configured to display the first handwriting and the second handwriting. The hardware processor is configured to: read first data to be shared in the first group; make a third group including the electronic apparatus and the first electronic apparatus; share the first data in the third group according to a third scheme by transmitting the first data to the first electronic apparatus from the transceiver; read second data to be shared in the second group; make a fourth group including the electronic apparatus and the third electronic apparatus; and share the second data in the fourth group according to a fourth scheme by transmitting the second data to the third electronic apparatus from the transceiver.

Figure 1:
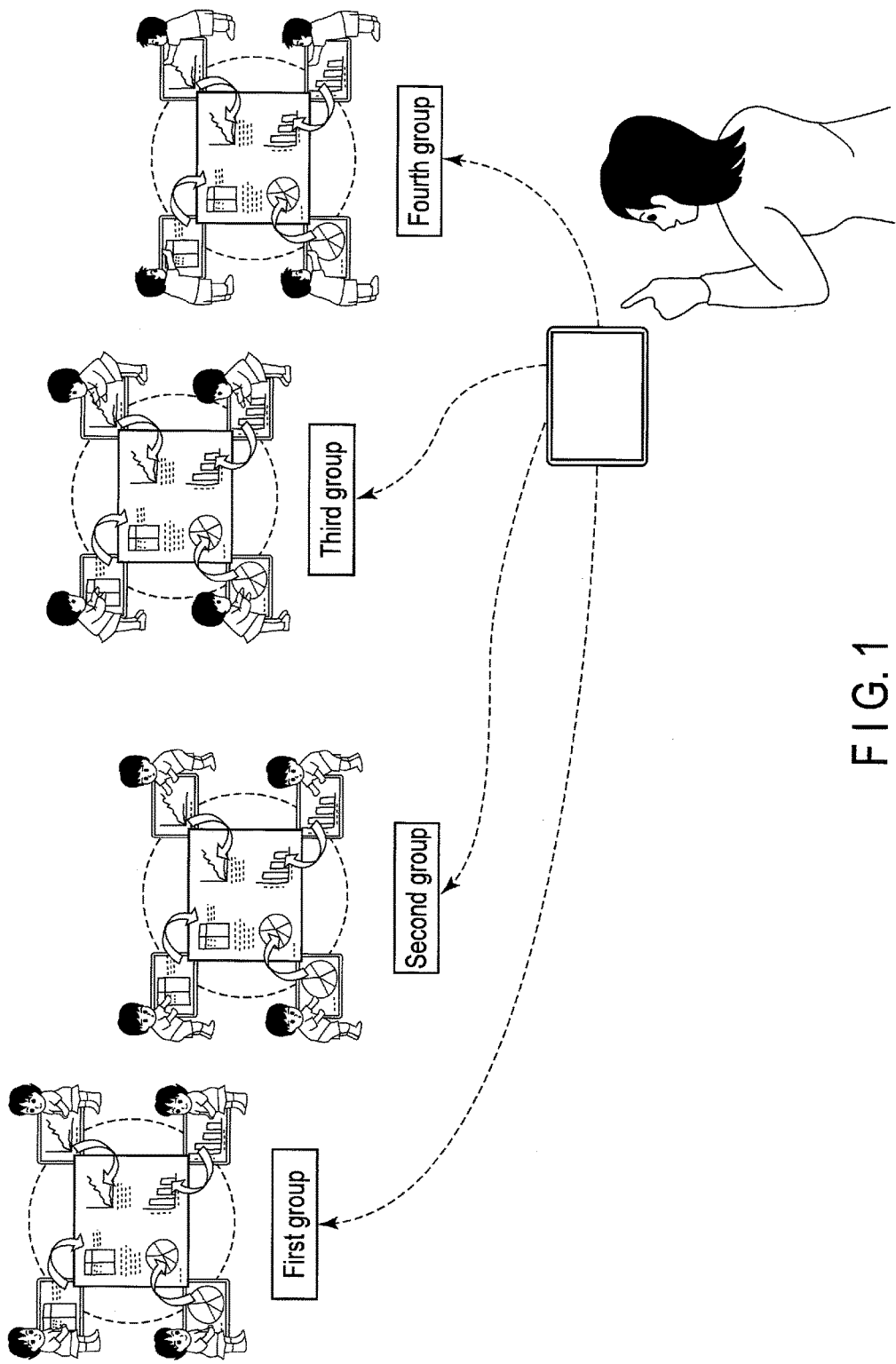
FIG. 1 is a view for explaining an example of a handwriting sharing service to be managed by an electronic apparatus (supervisor apparatus) according to an embodiment.

FIG. 1 shows an example of a group managed by an electronic apparatus according to an embodiment. This electronic apparatus is used as a supervisor apparatus which manages (monitors) at least one group utilizing a handwriting sharing service. The electronic apparatus executes processing for starting, ending, resuming or the like of the handwriting sharing service to each group.

Electronic apparatuses (hereinafter also referred to as user apparatuses) belong to a group. The electronic apparatuses of the group share handwritten information. Stroke data input by handwriting at an electronic apparatus in the group is delivered in real time to the other electronic apparatuses in the group. Therefore, descriptions of a handwritten text displayed on display screens of the electronic apparatuses can be synchronized with each other.

The handwriting sharing service, as shown in FIG. 1, is utilized as a service to be offered in, for example, a lesson support system in a school. An electronic apparatus (supervisor apparatus) for use by a teacher manages a group to which electronic apparatuses (user apparatuses) of students sharing handwritten information belong.

For such managements, the supervisor apparatus can be considered to establish network connections (sessions) with each of the user apparatuses (for example, N user apparatuses). However, in order that one-to-N network connections are established constantly, the supervisor apparatus needs to have a high throughput. Thus, an electronic apparatus having a low throughput, such as a tablet computer, cannot be used as the supervisor apparatus. Therefore, under conditions in which a server computer or the like cannot be introduced, it is hard to offer the handwriting sharing service.

Thus, in the embodiment, the supervisor apparatus manages a group by communicating with a user apparatus which is set to an owner apparatus of the group, only when it needs to do so. Furthermore, in the group, the owner apparatus manages the handwriting sharing service, to thereby cause handwritten information to be shared among user apparatuses participating in the group. By virtue of this feature, it is possible to manage user apparatuses sharing handwritten information, using a supervisor apparatus having a low throughput such as a tablet computer.

According to the embodiment, it is possible that for example, if M user apparatuses participate in each of N groups, a supervisor apparatus can manage (N×M) user apparatuses. It should be noted that if M=1, the supervisor apparatus, i.e., a single apparatus, can communicate with N user apparatuses (for example, sharing of one-to-N canvases). Thus, this system can be applied to, for example, a lesson support system to grasp the states of students.

Figure 2:
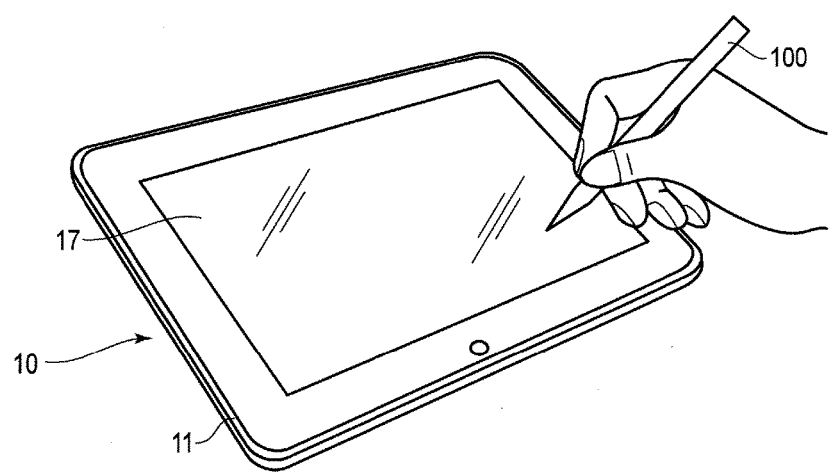
FIG. 2 is an exemplary perspective view showing an appearance of the electronic apparatus of the embodiment.

FIG. 2 is a perspective view showing an appearance of the electronic apparatus of the embodiment. This electronic apparatus is, for example, a portable pen-based electronic apparatus on which handwriting inputting can be performed with a pen (stylus) or a finger. The electronic apparatus can be implemented as a tablet computer, a notebook-type personal computer, a smartphone, a PDA or the like. In the following description, suppose the electronic apparatus is implemented as a tablet computer 10. The tablet computer 10 is a portable electronic apparatus also referred to as a tablet or a slate computer. The tablet computer 10 can operate as either a supervisor apparatus or a user apparatus. Using, for example, an application program to be executed on the tablet computer 10, the tablet computer 10 can switch between a mode in which it operates as a supervisor apparatus and a mode in which it operates as a user apparatus.

The tablet computer 10, as shown in FIG. 2, includes a main body 11 and a touch screen display 17. The touch screen display 17 is attached to the main body 11 such that it is laid on an upper surface of the main body 11.

The main body 11 includes a housing formed in the shape of a thin box. In the touch screen display 17, a flat panel display and a sensor are provided. The sensor detects a position (touch position) of part of the screen of the flat panel display, which the pen or finger contacts. As the flat panel display, for example, a liquid crystal display (LCD) may be applied. As the sensor, for example, an electrostatic capacity type touch panel, an electromagnetic induction type digitizer or the like can be used. Also, those two kinds of sensors, i.e., the digitizer and the touch panel, may be both incorporated in the touch screen display 17.

The touch screen display 17 can detect the position of part of its screen, which the finger or the pen contacts. As a pen 100, for example, an electromagnetic induction pen (digitizer pen) may be applied. A user can write a character or the like on the screen of the touch screen display 17, using an external object (the finger or the pen 100). During such a handwriting input operation, a locus of movement of the external object, i.e., a stroke input by handwriting, is drawn in real time on the screen. The locus of movement of the external object which is accomplished while the external object is in contact with the screen corresponds to a single stroke. Thus, a handwritten document is formed by strokes corresponding to characters or figures input by handwriting.

A single stroke is indicated by point data corresponding to points on the stroke. Each point data indicates coordinates (X coordinate and Y coordinate) of a corresponding point. Although as described above, the external object may be either the pen 100 or the finger, the following explanation is given with respect to the case where a handwriting inputting operation is performed using the pen 100.

Furthermore, the tablet computer 10 executes a handwriting sharing service in which handwritten information can be shared among electronic apparatuses. The handwriting sharing service enables the user of each of the electronic apparatuses to view the handwritten information to be shared, and edit the handwritten information in cooperation with the user of another one of the electronic apparatuses.

In such a manner, the handwriting sharing service is utilized by a group of persons. The group of persons utilizing the handwriting sharing service may include an owner (organizer) and one or more participants. The owner is also a participant of the group.

FIG. 3 shows an example of the connection between electronic apparatuses utilizing the handwriting sharing service.

An electronic apparatus (supervisor apparatus) 10S is a tablet computer used by a supervisor which manages the group.

An electronic apparatus (user apparatus) 10A is a tablet computer used by a user A belonging to a first group. An electronic apparatus (user apparatus) 10B is a tablet computer used by a user B belonging to the first group. An electronic apparatus (user apparatus) 100 is a tablet computer used by a user C belonging to the first group.

An electronic apparatus (user apparatus) 10D is a tablet computer used by a user D belonging to an $N^{th}$ group. An electronic apparatus (user apparatus) 10E is a tablet computer used by a user E belonging to the $N^{th}$ group. An electronic apparatus (user apparatus) 10F is a tablet computer used by a user F belonging to the $N^{th}$ group.

The supervisor apparatus 10S and the user apparatuses 10A, 10B, 100, 10D, 10E, and 10F have equivalent functions as the tablet computer 10 of the embodiment.

The supervisor apparatus 10S is connected to any one of each of the groups (the user apparatus 10A of the first group and the user apparatus 10D of the $N^{th}$ group in an example shown in FIG. 3) through a wired network or a wireless network. The user apparatuses 10A, 10B and 10C of the first group may be connected to each other through the wired network or the wireless network. Also, the user apparatuses 10D, 10E and 10F of the $N^{th}$ group may be connected to each other through the wired network or the wireless network. As a method of wirelessly connecting two apparatuses to each other, arbitrary wireless connection standards based on which apparatuses are wirelessly connected to each other can be applied. For example, Wi-Fi Direct (registered trademark) or Bluetooth (registered trademark) may be applied.

In the example shown in FIG. 3, the supervisor apparatus 10S and the user apparatus 10A of the first group are connected to each other through the wireless network, and the supervisor apparatus 10S and the user apparatus 10D of the $N^{th}$ group are connected to each other through the wireless network. In the first group, the user apparatus 10A and the user apparatus 10B are connected through the wireless network, and the user apparatus 10A and the user apparatus 10B are also connected through the wireless network. In the $N^{th}$ group, the user apparatus 10D and the user apparatus 10E are connected through the wireless network, and the user apparatus 10D and the user apparatus 10F are connected through the wireless network.

The supervisor apparatus 10S starts handwriting sharing services for each of the groups, and executes processing for allowing user apparatuses requesting participation in the groups to utilize the handwriting sharing services. The supervisor apparatus 10S functions as a provisional owner apparatus (provisional server), which executes the handwriting sharing services for the groups. The owner is an organizer of the handwriting sharing services.

To be more specific, the supervisor apparatus 10S starts a handwriting sharing service for a group, and transmits, if any user apparatus requests the supervisor apparatus (owner) to participate in a group, data shared in the group to the user apparatus. The supervisor apparatus 10S may determine whether to permit the user apparatus requesting the participation in the group to participate in the group, i.e., whether to permit the user apparatus to log in to the handwriting sharing service. Only an apparatus, which receives permission to participate in the group (log in to the service) from the owner, may be permitted to log in to the handwriting sharing service, i.e., participate in the group.

It should be noted that as a method for permitting each apparatus (terminal) to log in to the handwriting sharing service, it may be set that each apparatus can log in to the handwriting sharing service, using its ID (account). Alternately, an ID (account) of a user of each apparatus may be applied to log in to the handwriting sharing service. That is, as the method of logging in to or logging out from the handwriting sharing service, either the ID (account) of each apparatus or the ID (account) of the user of each apparatus may be applied.

Next, the supervisor apparatus 10S executes processing for changing the owner apparatus of the above group from the supervisor apparatus 10S to a user apparatus first participating in the group. Suppose the user apparatus 10A first participates in the first group, and the user apparatus 10D first participates in the $N^{th}$ group. In this case, the supervisor apparatus 10S changes the owner apparatus of the first group from the supervisor apparatus 10S to the user apparatus 10A, and the owner apparatus of the $N^{th}$ group from the supervisor apparatus 10S to the user apparatus 10D. This processing for changing the owner apparatus will be described later in detail.

The user apparatus 10A, which is set as the owner of the first group, starts a handwriting sharing service for the first group according to a first scheme, and executes processing for the user apparatuses 10B and 10C requesting participation in the first group to utilize the handwriting sharing service. If the user apparatuses 10B and 10C request the user apparatus 10A to participate in the first group, the user apparatus 10A executes processing for causing the user apparatuses 10A, 10B and 10C to share handwritten information.

Suppose the user apparatuses 10A, 10B and 10C now logs in to the handwriting sharing service in the first group; that is, the user apparatuses 10A, 10B and 10C participate in the first group. In the user apparatuses 10A, 10B and 10C, a shared screen (canvas) for handwriting is displayed for viewing shared handwritten information. The shared screen (canvas) for handwriting is also used as a common display area for the user apparatuses 10A, 10B and 10C. The shared screen (canvas) for handwriting enables visual communication to be carried out between the user apparatuses 10A, 10B and 10C. The visual communication enables the apparatuses 10A, 10B and 10C to exchange handwritten information or various electronic documents.

Stroke data input by handwriting input operation by each of the users A, B and C in an apparatus used by each user is displayed in real time not only in the shared screen (canvas) for handwriting in the apparatus, but in the shared screens (canvases) for handwriting in apparatuses used by the other users. Thus, stroke data (handwritten characters, handwritten figures or the like) input by handwriting by each of the users A, B and C, can be exchanged and shared among the users A, B and C.

Furthermore, the user apparatuses 10A, 10B and 10C can also display the same content such as the same teaching material on the canvas. In this case, stroke data input by handwriting in each of the user apparatuses is displayed on the content. While viewing the same content, the users A, B and C can exchange and share the handwritten characters, handwritten figures or the like on the content.

Similarly, the user apparatus 10D, which is set as the owner apparatus of the $N^{th}$ group, starts a handwriting sharing service for the $N^{th}$ group according to an $N^{th}$ scheme, and executes processing for the user apparatuses 10E and 10F requesting participation in the $N^{th}$ group to utilize the handwriting sharing service. Also, if the user apparatuses 10E and 10F request the user apparatus 10D to participate in the $N^{th}$ group, the user apparatus 10D executes processing for causing the user apparatuses 10D, 10E and 10F to share handwritten information.

Furthermore, the supervisor apparatus 10S communicates with the user apparatuses 10A and 10D set as the owner apparatuses of the respective groups, to thereby manage the groups. Even unless the supervisor apparatus 10S is the owner apparatus of each of the groups, it can manage the groups by, for example, receiving thumbnail images (thumbnail image images) of the shared screens (canvas) from the user apparatuses 10A and 10D or data shared by each of the groups, or participating in the groups. It is therefore possible to reduce the load of the processing on the supervisor apparatus 10S.

Figures 4, 5:
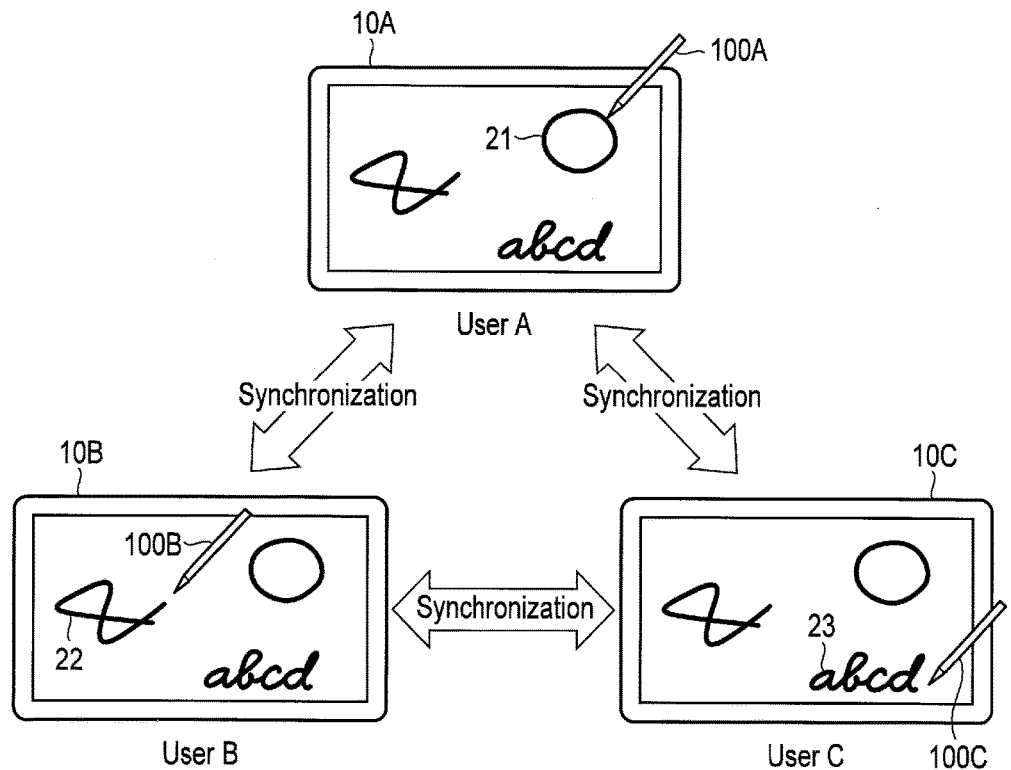
FIG. 4 is a view showing an example of the case where user apparatuses (electronic apparatuses) share the same screen (canvas).
FIG. 5 is a view showing an example of a relationship between a writer and each of strokes in a screen (canvas) in which handwritten information is shared among user apparatuses.

FIG. 4 shows an example of the case where the user apparatuses 10A, 10B and 10C share the same canvas.

In the handwriting sharing service, the user apparatuses 10A and 10B are wirelessly connected to each other, and the user apparatuses 10A and 10C are wirelessly connected to each other. Also, in the handwriting sharing service, the apparatuses are synchronized with each other in screen (screen image) displaying and handwriting operation, thereby to enable the users of the apparatuses to simultaneously perform handwriting inputting operation on the canvases of the apparatuses which are the same as each other.

On the canvases of the user apparatuses 10A, 10B and 10C, each of strokes 21, 22 and 23 is displayed in the same manner. As shown in FIG. 5, the stroke 21 is a stroke input by handwriting by the user A at the user apparatus 10A. The stroke 22 is a stroke input by handwriting by the user B at the user apparatus 10B. The stroke 23 is a stroke input by handwriting by the user C at the user apparatus 10C.

Figure 6:
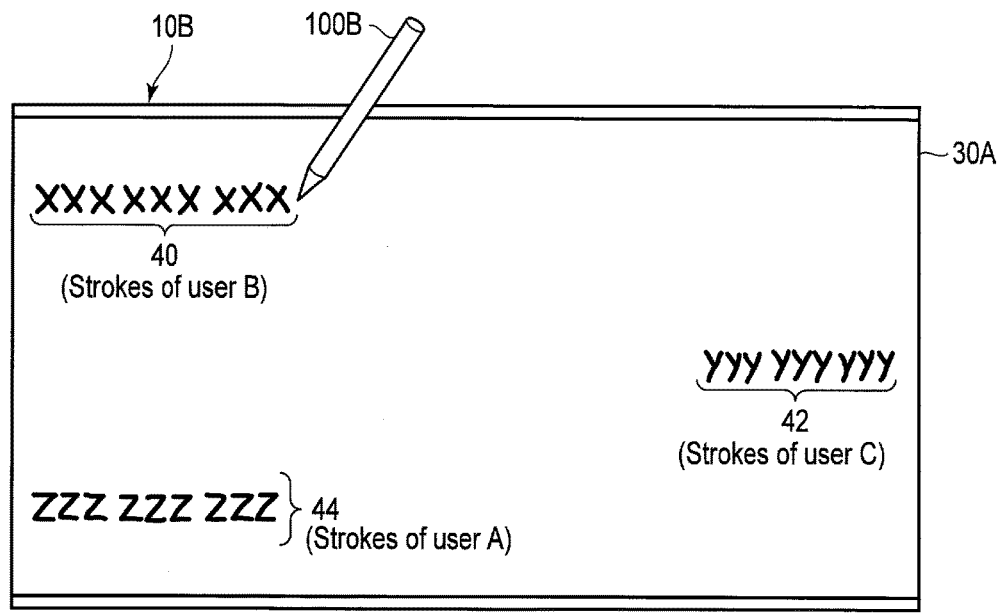
FIG. 6 is a view showing an example of a screen (canvas) in which handwritten information is shared among the user apparatuses.

FIG. 6 shows an example of the shared screen (canvas) of handwriting. A canvas 30A of each of the user apparatuses is a handwriting area. In the handwriting area 30A, a stroke handwritten by each of the user is displayed. It should be noted that such content as a teaching material may be displayed on the canvas 30A. In this case, the stroke of each user is drawn on the content.

For example, on the canvas 30A of the user apparatus 10B, strokes handwritten with the pen 100B by the user B on the canvas 30A are displayed. Also, on the canvas 30A, strokes handwritten on the other user apparatuses, i.e., the user apparatuses 10A and 100, are displayed. The strokes handwritten on the other user apparatuses include strokes 42 handwritten on the user apparatus 10C of the user C and strokes 44 handwritten by the user apparatus 10A of the user A.

Next, stroke data will be explained with reference to FIG. 7.

Figure 7:
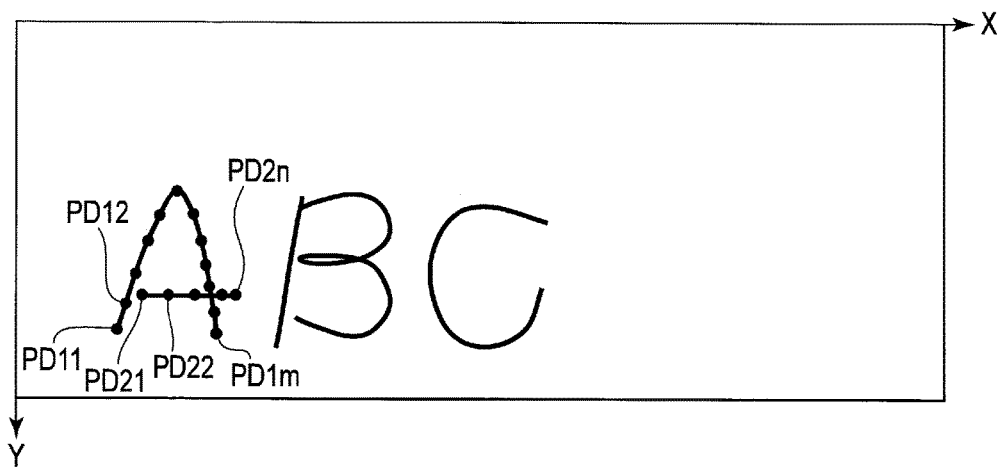
FIG. 7 is a view showing an example of a handwritten document handwritten on a touch-screen display of each of the user apparatuses and the electronic apparatus of the embodiment.

FIG. 7 shows the case where the handwritten character string "ABC" is handwritten in the order of "B" and "C".

The handwritten character "A" is expressed by two strokes (the "Λ" stroke and the "-" stroke) handwritten with the pen 100 or the like.

When the pen 100 is being moved, the locus of the pen 100 to draw a shape of "Λ" is sampled in real time. Thereby, point data (coordinate data) PD11, PD12, . . . , and PD1$m$ corresponding to points on the locus of the pen 100 of the shape of "Λ" are subsequently generated. For example, it may be set that each time the pen 100 on the screen is moved by a predetermined distance to a new position, a point data indicative of the new position is generated. Although in order that FIG. 7 be simplified, it shows that points corresponding to point data to be generated are arranged at a low density, actually, point data corresponding to points arranged at a high density are generated. The point data PD11, PD12, . . . , and PD1*m* are used in drawing the "Λ" locus of the pen 100 on the screen. The "Λ" locus of the pen 100 is drawn in real time on the screen in such a way as to follow the movement of the pen 100.

Similarly, the locus of the pen 100 to draw "-" is sampled in real time, while the pen 100 is being moved. Thereby, point data (coordinate data) PD21, PD22, . . . , and PD2*n* corresponding to points on the "-" locus of the pen 100 are subsequently generated.

The handwritten character "B" is expressed by two strokes handwritten with the pen 100 or the like. The handwritten character "C" is formed by a single stroke handwritten with the pen 100 or the like.

Figure 8:
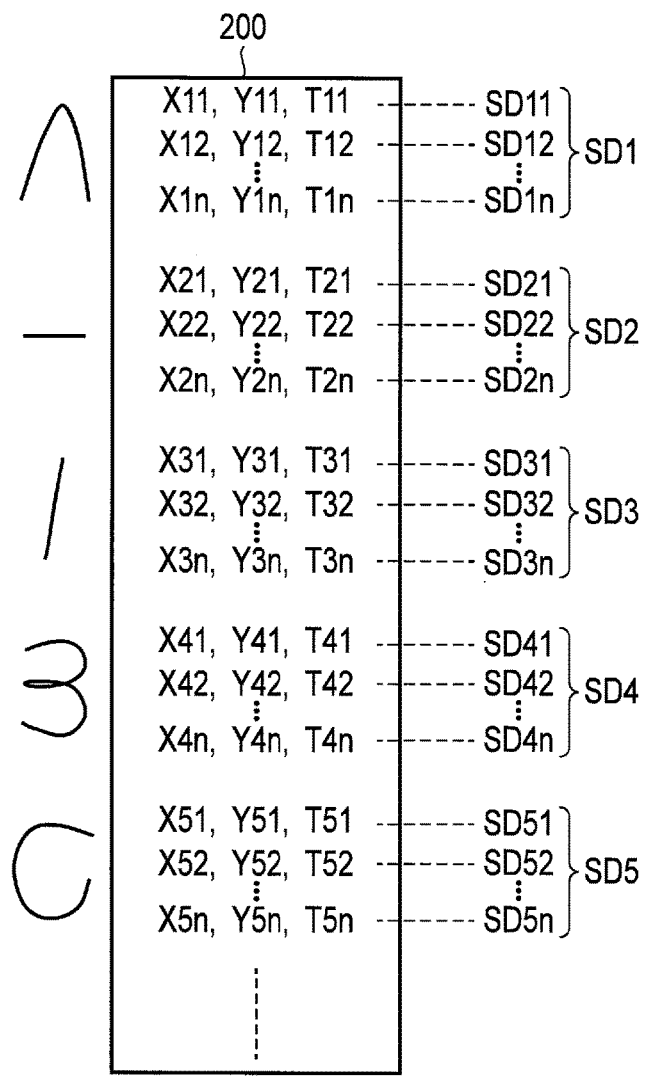
FIG. 8 is a view showing an example of time-series information associated with the handwritten document as shown in FIG. 7.

FIG. 8 shows time-series information 200 associated with the handwritten character string as shown in FIG. 7. The time-series information 200 includes stroke data SD1, SD2, . . . , and SD5. In the time-series information 200, the stroke data SD1, SD2, . . . , and SD5 are arranged in order of handwriting, i.e., in order of strokes handwritten in time series.

In the time-series information 200, first two stroke data SD1 and SD2 are indicative of two strokes constituting the handwritten character "A", respectively. The third and fourth stroke data SD3 and SD4 are indicative of two strokes constituting the handwritten character "B", respectively. The fifth stroke data SD5 is indicative of a single stroke constituting the handwritten character "C".

Each of the stroke data includes coordinates corresponding to points on the locus of a stroke. In each stroke data, the coordinates are arranged in time sequence in the order in which the stroke is drawn. For example, in the handwritten character "A", the stroke data SD1 includes coordinate data series (time-series coordinates) corresponding to the points on the locus of the "Λ" stroke of the handwritten character "A", i.e., n coordinate data SD11, SD12, . . . , and SD1*n*. Stroke data SD2 includes coordinate data series corresponding to the points on the locus of the stroke "-" of the handwritten character "A", i.e., n coordinate data SD21, SD22, . . . , and SD2*n*. The number of coordinate data may vary from one stroke data from another.

Each of the coordinate data indicates an X coordinate and a Y coordinate corresponding to a certain point in an associated locus. For example, coordinate data SD11 indicates the X coordinate (X11) and the Y coordinate (Y11) of the starting point of the stroke "Λ". Coordinate data. SD1*n* indicates the X coordinate (X1*n*) and the Y coordinate (Y1*n*) of the ending point of the stroke "Λ".

Furthermore, each coordinate data may include time stamp information T corresponding to the point of time when a point whose coordinates are indicated by the coordinate data was handwritten. The point of time when the point was handwritten may be an absolute time (for example, year, month, date, hour, minute, and second) or a relative time determined with respect to a certain point of time. For example, the absolute time (for example, year, month, day, hour, minute, and second) at which the stroke starts being handwritten may be added to each stroke data as time stamp information, and the relative time indicating the difference between the absolute time and the certain point of time may be added as time stamp information T to the stroke data.

Moreover, data (Z) indicating a writing pressure may be added to each coordinate data.

FIG. 9 shows flows of data between the supervisor apparatus 10S and the user apparatuses 10A, 10B and 10C in the case where a handwriting sharing service for the first group starts. FIG. 9 shows by way of example the case where after the supervisor apparatus 10S operates as a provisional owner apparatus (server) for a handwriting sharing service for the first group, the user apparatus 10A, which first participates in the first group, operates as the owner apparatus (server) for a handwriting sharing service for the first group. The user apparatuses 10B and 10C participate in the first group in which the user apparatus 10A operates as the owner apparatus. Therefore, the user apparatuses 10B and 10C operate as clients.

The supervisor apparatus 10S makes the first group. The supervisor apparatus 10S generates format data (shared data) of a shared screen (canvas) shared in the handwriting sharing service for the first group, and stores the generated format data in a local database 12S.

Using the generated format data, the supervisor apparatus 10S starts as a provisional owner apparatus a handwriting sharing service for the first group. Then, the supervisor apparatus 10S receives a request for participation in the first group, from the user apparatus 10A which first participates in the first group. Upon reception of the request, the supervisor apparatus 10S transmits the format data shared in the first group to the user apparatus 10A. The user apparatus 10A receives the format data, and stores it in a local database 12A. Thereby, each of the supervisor apparatus 10S and the user apparatus 10A can display a screen (screen image) based on the format data on its display. Thus, the screen can be shared between the apparatuses 10S and 10A.

Next, the supervisor apparatus 10S, which operates as the provisional owner apparatus, ends the handwriting sharing service for the first group, and causes the user apparatus 10A to start a handwriting sharing service for the first group. The user apparatus 10A uses the format data transmitted from the supervisor apparatus 10S to start as the owner apparatus the handwriting sharing service for the first group.

Then, the user apparatus 10A transmits the format data for the first group to the user apparatus 10B in response to a request for participation in the first group, which is made by the user apparatus 10B. Similarly, the user apparatus 10A transmits the format data for the first group to the user apparatus 10C in response to a request for participation in the first group, which is made by the user apparatus 10C. The user apparatuses 10B and 10C receive the format data and store it in the local databases 12B and 12C, respectively. Thereby, the user apparatuses 10A, 10B and 10C can display a screen (screen image) based on the format data on their displays. That is, the screen can be shared among the user apparatuses 10A, 10B and 10C.

Processing corresponding to the flows of data as shown in FIG. 9 will be specifically explained with reference to FIGS. 10 and 11.

FIG. 10 shows processing between the supervisor apparatus 10S which is a provisional owner apparatus of the first group and the user apparatus 10A which first participates in the first group and is set as an owner apparatus of the first group.

First, the supervisor apparatus 10S makes the first group (S101), and provisionally opens the first group (S102). That is, the supervisor apparatus 10S executes a handwriting sharing service for the first group.

The user apparatus 10A multicasts a request for searching for an opened group or groups in order to search for a group or groups in which it can participate (S103). Since the supervisor apparatus 10S has opened the first group, it notifies the user apparatus 10A that the first group has been opened (S104). The user apparatus 10A can be given a notification indicating another group opened by the supervisor apparatus 10S or a notification indicating a group opened by another apparatus.

In accordance with the information indicating an opened group or groups, the user apparatus 10A displays, for example, a list of the opened group or groups on its screen. The user A of the user apparatus 10A selects a group (the first group in this case) in which the user A wishes to participate, from the displayed list, and the user apparatus 10A transmits a request for participation in the selected group to the supervisor apparatus 10S which is the owner apparatus of the group (S105).

The supervisor apparatus 10S transmits group shared data (format data) for the selected first group to the user apparatus 10A, in response to the request for participation in the group, which is made by the user apparatus 10A (S106). The user apparatus 10A receives the group shared data, stores it in the local database 12A, and transmits an acknowledgement of receipt to the supervisor apparatus 10S (S107).

After receiving the acknowledgement of receipt from the user apparatus 10A, the supervisor apparatus 10S notifies the user apparatus 10A that the first group will be closed (S108). The user apparatus 10A exits from the first group in accordance with the above notification, and the supervisor apparatus 10S is notified that the user apparatus 10A exits from the first group (S109).

The supervisor apparatus 10S closes the first group in accordance with the exit of the user apparatus 10A from the first group, and requests the user apparatus 10A to open the first group (S110). In response to this request, the user apparatus 10A opens the first group with the group shared data stored in the local database 12A (S111). That is, the user apparatus 10A executes a handwriting sharing service for the first group. By virtue of the above feature, it is possible to cause the user apparatus of a user (for example, a child) who cannot easily make or manage a group to open a group without making the user recognize that the user is an owner of the group.

Figure 11:
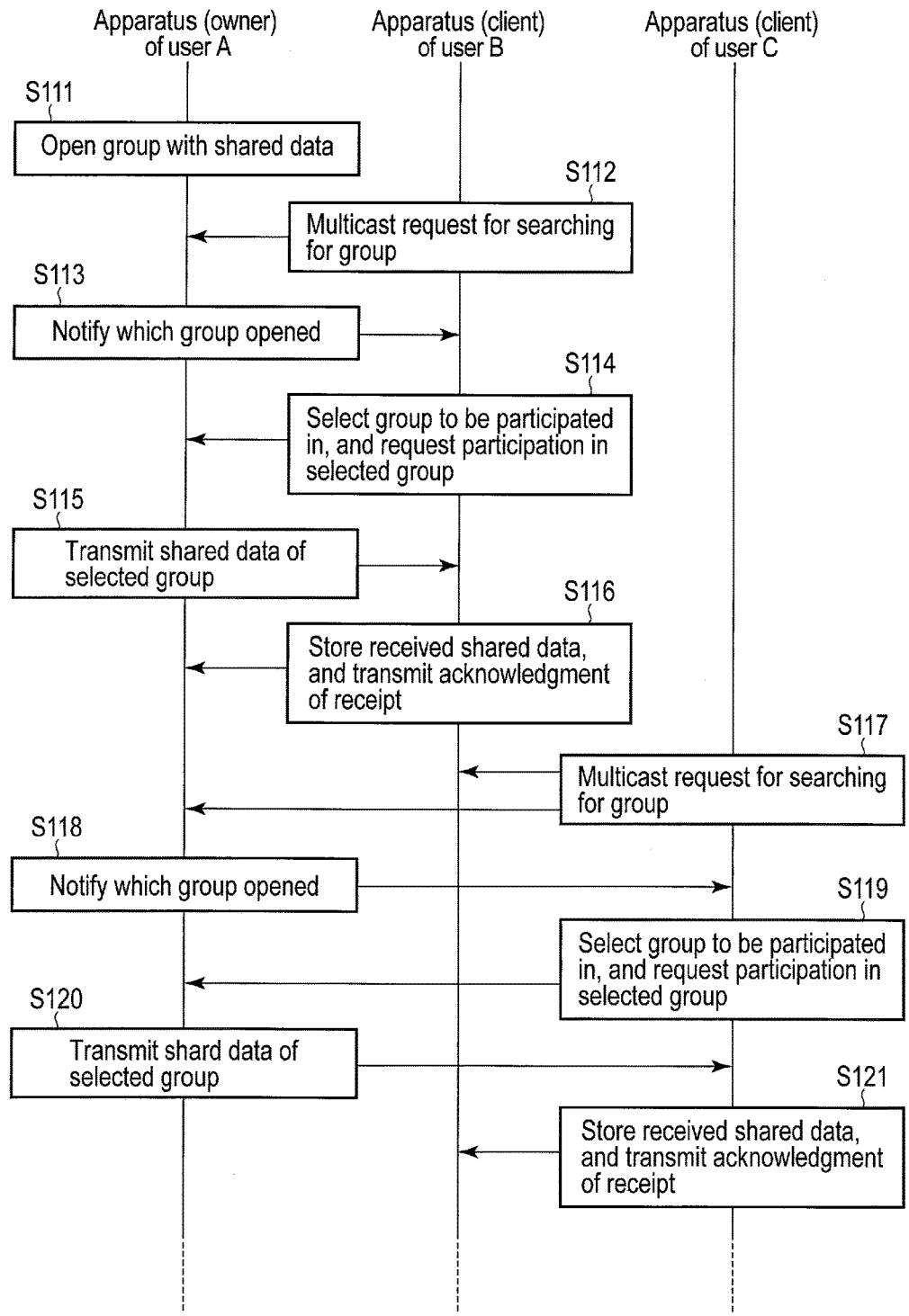
FIG. 11 is a view for explaining an example of the procedure of processing for starting the handwriting sharing service in the case where the user apparatus as indicated in FIG. 10 is an owner.

FIG. 11 shows processing between the user apparatus 10A which is the owner apparatus of the first group and the user apparatuses 10B and 10C which participate in the first group, the processing being executed subsequent to the processing as shown in FIG. 10.

As described above, the user apparatus 10A opens the first group with the group shared data stored in the local database 12A (S111). The user apparatus 10B multicasts a request for searching for an opened group in order to search for a group in which it can participate (S112). Since the user apparatus 10A has opened the first group, it notifies the user apparatus 10B that the first group has been opened (S113). The user apparatus 10B can be given information indicating another group opened by the user apparatus 10A or information indicating a group opened by another apparatus.

In accordance with the information indicating an opened group or opened groups, the user apparatus 10B displays, for example, a list of the opened groups on a screen of the user apparatus 10B. The user B of the user apparatus 10B selects a group (the first group in this case) in which the user B wishes to participate, from the displayed list, and the user apparatus 10B transmits a request for participation in the selected group to the user apparatus 10A which is the owner apparatus of the group (S114).

The user apparatus 10A transmits the group shared data for the selected first group to the user apparatus 10B in response to the request for participation in the first group, which is made by the user apparatus 10B (S115). The user apparatus 10B receives the group shared data, stores it in the local database 12B, and transmits an acknowledgment of receipt to the user apparatus 10A (S116).

Similarly, the user apparatus 10C multicasts a request for searching for an opened group in order to search for a group in which it can participate (S117). Since the user apparatus 10A has opened the first group, it notifies the user apparatus 10C that the first group has been opened (S118). The user apparatus 10C can be given information indicating another group opened by the user apparatus 10A or information indicating a group opened by another apparatus.

In accordance with the information indicating an opened group or opened groups, the user apparatus 10C displays, for example, a list of the opened groups on a screen of the user apparatus 10C. The user C of the user apparatus 10C selects a group (the first group in this case) in which the user C wishes to participate, from the displayed list, and the user apparatus 10B transmits a request for participation in the selected group to the user apparatus 10A which is the owner apparatus of the group (S119).

The user apparatus 10A transmits the group shared data for the selected first group to the user apparatus 10C in response to the request for participation in the first group, which is made by the user apparatus 10C (S120). The user apparatus 10C receives the group shared data, stores it in the local database 120, and transmits an acknowledgment of receipt to the user apparatus 10A (S121).

Consequently, the user apparatuses 10B and 100 can participate in the first group for which the user apparatus 10A is the owner apparatus.

Figure 12:
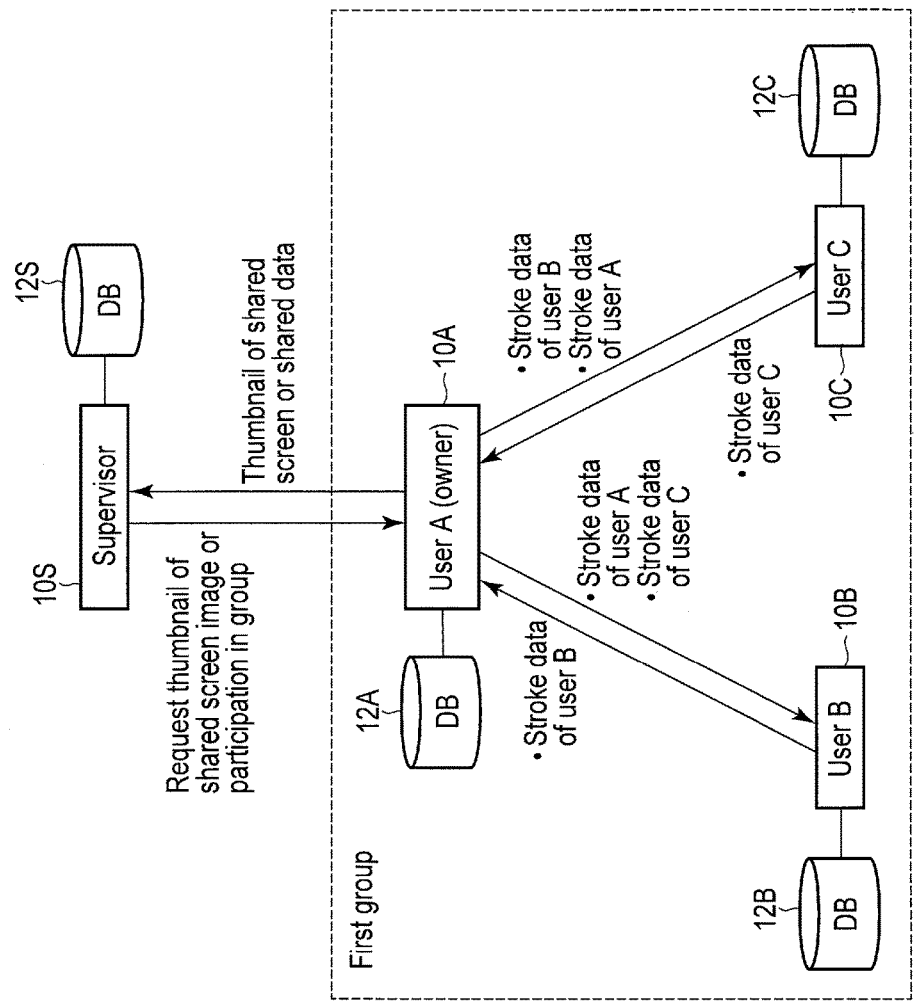
FIG. 12 is an exemplary view for explaining an outline of the data flow between the user apparatuses and the electronic apparatus of the embodiment during the handwriting sharing service.

FIG. 12 shows flows of data between the supervisor apparatus 10S and the user apparatuses 10A, 10B and 10C during execution of the handwriting sharing service for the first group according to a scheme. FIG. 12 shows by way of example the case where the user apparatuses 10B and 10C participate in the first group for which the user apparatus 10A is the owner, and the supervisor apparatus 10S manages the first group.

The user apparatus 10A receives from the user apparatus 10B, stroke data (stroke data on the user B) corresponding a stroke or strokes input by handwriting at the user apparatus 10B. Also, the user apparatus 10A receives from the user apparatus 10C stroke data (stroke data on the user C) corresponding to a stroke or strokes input by handwriting at the user apparatus 10C.

Furthermore, the user apparatus 10A transmits to the user apparatus 10B, stroke data (stroke data on the user A who is the owner of the group) corresponding to a stroke or strokes input by handwriting at the user apparatus 10A and the stroke data (the stroke data on the user C) received from the user apparatus 10C. In addition, the user apparatus 10A transmits to the user apparatus 10C, the stroke data (the stroke data on the user A who is the owner of the group) corresponding to the stroke or strokes input by handwriting at the user apparatus 10A and the stroke data (the stroke data on the user B) received from the user apparatus 10B.

Therefore, on the screen of the user apparatus 10A, not only the stroke or strokes of the user A (the owner) but those of the user B and of the user C are displayed.

Similarly, on the screen of the user apparatus 10B, not only the stroke or strokes of the user B but also those of the user A (the owner) and of the user C are displayed.

Also, similarly, on the screen of the user apparatus 10C, not only the stroke or strokes of the user C but also those of the user A (the owner) and of the user B are displayed.

In such a manner, the screens of the user apparatuses 10A, 10B and 10C are made to display the same screen (screen image) including the same strokes. Therefore, the screen is shared among the user apparatuses 10A, 10B and 10C.

Each of the user apparatuses 10A, 10B and 10C stores stroke data corresponding to a stroke or strokes input by handwriting at each apparatus in the local database 12A, 12B or 12C. Also, each of the user apparatuses 10A, 10B and 10C stores stroke data transmitted from another one or others of the user apparatuses in the local database 12A, 12B or 12C.

The supervisor apparatus 10S manages the first group in which handwritten strokes are shared in the above manner. The supervisor apparatus 10S requests a thumbnail image of the screen (canvas) shared in the first group, i.e., a thumbnail image of the screen including the stokes of the users A, B and C, from the user apparatus 10A which is the owner of the first group. In response to this request, the user apparatus 10A generates a thumbnail image of the screen shared in the first group, and transmits it to the supervisor apparatus 10S. As a result, the display of the supervisor apparatus 10S can display the thumbnail image of the shared screen of the first group.

Furthermore, the supervisor apparatus 10S requests the user apparatus 10A (owner apparatus) to permit the supervisor apparatus 10S to participate in the first group. The user apparatus 10A permits the supervisor apparatus 10S to participate in the first group, and transmits shared data of the first group to the supervisor apparatus 10S. The shared data of the first group includes, for example, the stroke data stored in the local database 12A (i.e., the stroke data corresponding to the stroke or strokes input by handwriting at the user apparatus 10A and the stroke data received from the other user apparatuses 10B and 10C).

The supervisor apparatus 10S stores the received shared data of the first group in the local database 12S. Thereby, the supervisor apparatus 10S can collect the shared data of the first group.

After collecting the shared data, the supervisor apparatus 10S may exit from the first group or keep on participating in the first group. If keeping on participating in the first group, using the shared data, the supervisor apparatus 10S displays the shared screen of the first group on its display. The supervisor apparatus 10S transmits the stroke data corresponding to the stroke or stokes input by handwriting at the supervisor apparatus 10S to the user apparatus 10A (owner apparatus). Also, the supervisor apparatus 10S receives from the user apparatus 10A, the stoke data corresponding to the strokes input by handwriting at the user apparatuses 10A, 10B and 10C.

Therefore, on the display of the supervisor apparatus 10S, not only the stroke or strokes of the supervisor but also those of the users A, B and C are displayed. Similarly, on the displays of the user apparatuses 10A, 10B and 10C, not only the stroke or strokes of the users A, B and C but those of the supervisor are displayed.

Processing corresponding to the flows of data as shown in FIG. 12 will be specifically explained with references to FIGS. 13 to 19.

Figure 13:
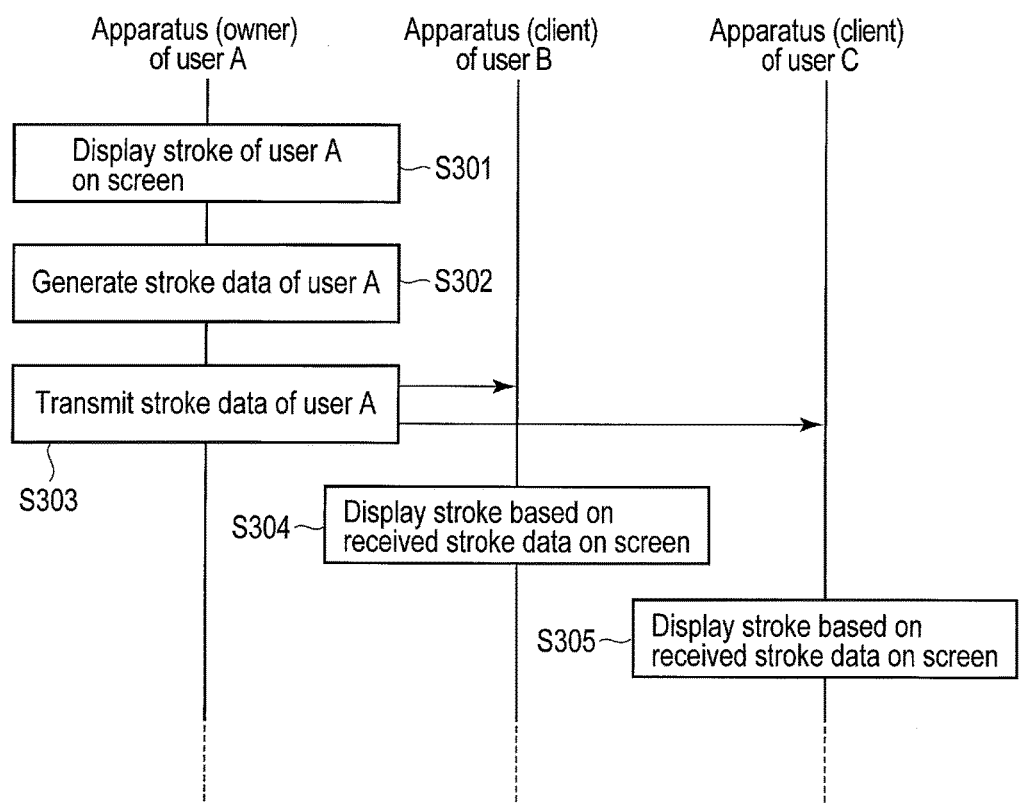
FIG. 13 is a view for explaining an example of the procedure of processing of the handwriting sharing service in the case where the user apparatus as indicated in FIG. 10 is the owner.
Figure 14:
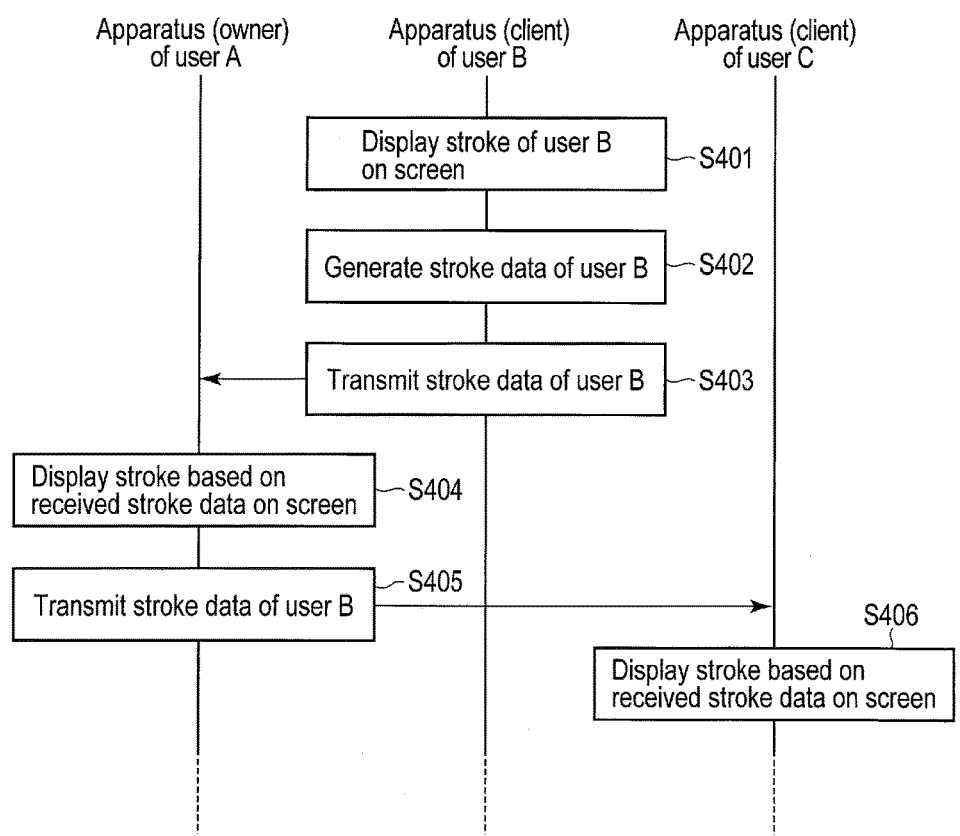
FIG. 14 is a view for explaining an example of another procedure of the processing of the handwriting sharing service in the case where the user apparatus as indicated in FIG. 10 is the owner.

FIGS. 13 and 14 show processing of the user apparatus 10A which is the owner of the first group, and the user apparatuses 10B and 10C which participate in the first group.

Processing in the case where a stroke is input by handwriting at the user apparatus 10A of the owner will be explained by referring to an example as shown in FIG. 13.

The user apparatus 10A displays a stroke input by handwriting by the user A on the screen (S301), and generates stroke data corresponding to the stroke (S302). Then, the user apparatus 10A transmits the generated stroke data to the user apparatuses 10B and 10C (S303).

The user apparatus 10B receives the stroke data from the user apparatus 10A, and displays the stroke based on the received stroke data, on the screen (S304). Also, the user apparatus 10C receives the stroke data from the user apparatus 10A, and displays the stroke based on the received stroke data, on the screen (S305).

An example as shown in FIG. 14 will be explained with respect to processing in the case where a stroke is input by handwriting at the user apparatus 103 which is a client (participant).

The user apparatus 10B displays a stroke input by handwriting by the user B on the screen (S401), and generates stroke data corresponding to the stroke (S402). Then, the user apparatus 10B transmits the generated stroke data to the user apparatus 10A of the owner (S403).

The user apparatus 10A receives the stroke data from the user apparatus 10B, and displays a stroke based on the received stroke data, on the screen (S404). Then, the user apparatus 10A transmits the stroke data of the user apparatus 10B to the apparatus 10C (S405).

The user apparatus 10C receives the stroke data from the user apparatus 10A, and displays a stroke based on the received stroke data, on the screen (S406).

It should be noted that also in the case where a stroke is input by handwriting at the user apparatus 10C, the equivalent processing as shown in FIG. 14 is executed.

By virtue of the processing as shown in FIGS. 13 and 14, the display of each of the user apparatuses 10A, 10B and 10C can display not only the stroke or strokes input by handwriting at each user apparatus, but also the stroke or strokes input by handwriting at another or other user apparatuses.

Figure 15:
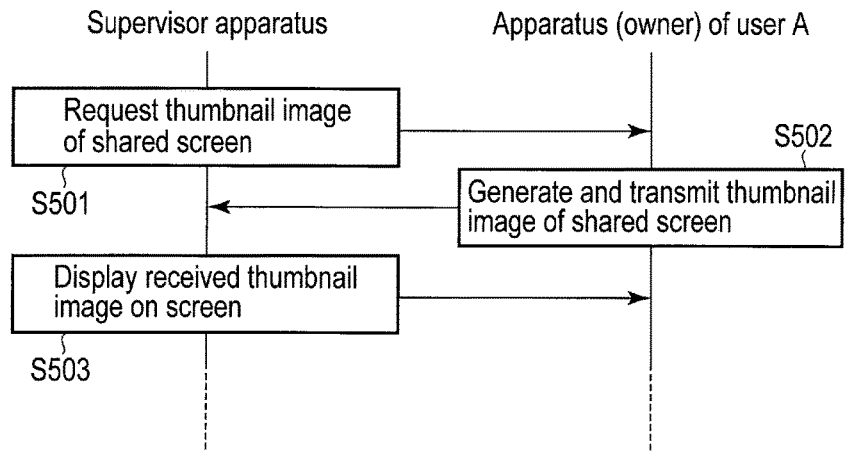
FIG. 15 is a view for explaining an example of the procedure of processing for updating a thumbnail image of a shared screen by the electronic apparatus of the embodiment during the handwriting sharing service in the case where the user apparatus as indicated in FIG. 10 is the owner.
Figure 16:
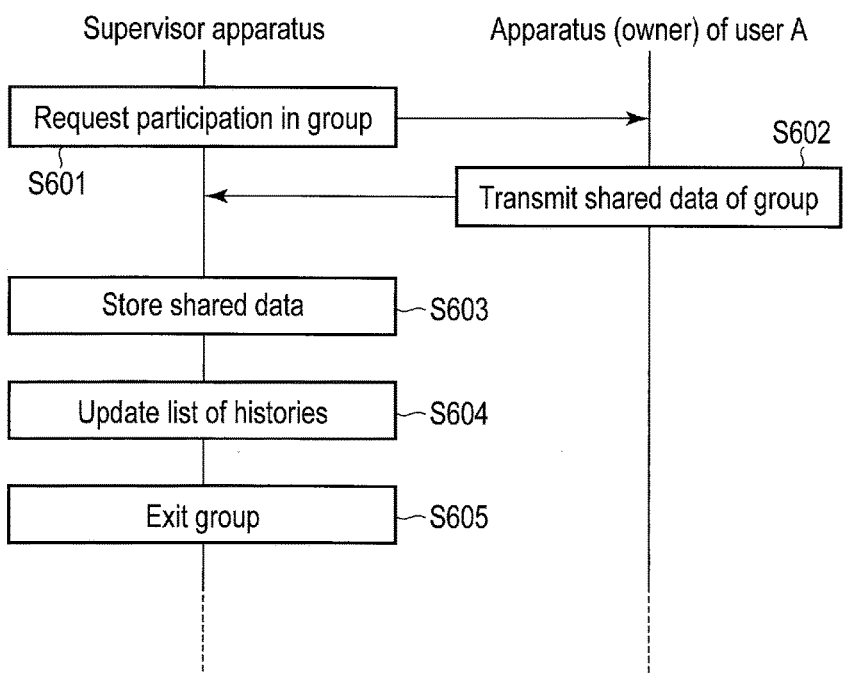
FIG. 16 is a view for explaining an example of the procedure of processing for storing the shared data with the electronic apparatus of the embodiment during the handwriting sharing service in the case where the user apparatus as indicated in FIG. 10 is the owner.

FIGS. 15 and 16 show processing between the supervisor apparatus 10S and the user apparatus 10A which is the owner of the first group.

First of all, by referring to an example shown in FIG. 15, the following explanation is given with respect to processing in the case where a thumbnail image of a shared screen of the first group is displayed on the display of the supervisor apparatus 10S.

The supervisor apparatus 10S requests a thumbnail image of a shared screen from the user apparatus 10A (S501). In response to this request, the user apparatus 10A generates a thumbnail image of the shared screen, and transmits it to the supervisor apparatus 10S (S502). Then, the supervisor apparatus 10S displays the received thumbnail image on the screen (S503).

From displayed thumbnail images which are obtained in the above manner from groups, respectively, the supervisor can ascertain the states of the groups. To be more specific, in the case where the supervisor apparatus 10S manages groups, thumbnail images associated with the groups are displayed on the screen. The supervisor apparatus 10S updates the thumbnail images to be displayed on the screen by requesting user apparatuses which are respective owner for the groups, to transmit thumbnail images associated with the groups, for example, at regular intervals.

Next, by referring to an example shown in FIG. 16, the following explanation is given with respect to the case where the supervisor apparatus 10S collects the shared data of the first group.

The supervisor apparatus 10S requests the user apparatus 10A to participate in the first group (S601). In accordance with the request for participation in the first group, which is made by the supervisor apparatus 10S, the user apparatus 10A transmits the shared data of the first group to the supervisor apparatus 10S (S602).

The supervisor apparatus 10S stores the received shared data of the first group in the local database 12S (S603). Using the shared data, the supervisor apparatus 10S updates a list of histories of groups managed by the supervisor apparatus 10S (S604). On the display of the supervisor apparatus 10S, the list of the histories of the groups is displayed. Using the above received shared data of the first group, the supervisor apparatus 10S may add a new item to the list or update an item associated with the first group in the list. Then, the supervisor apparatus 10S notifies the user apparatus 10A that it exits from the first group (S605).

Figure 17:
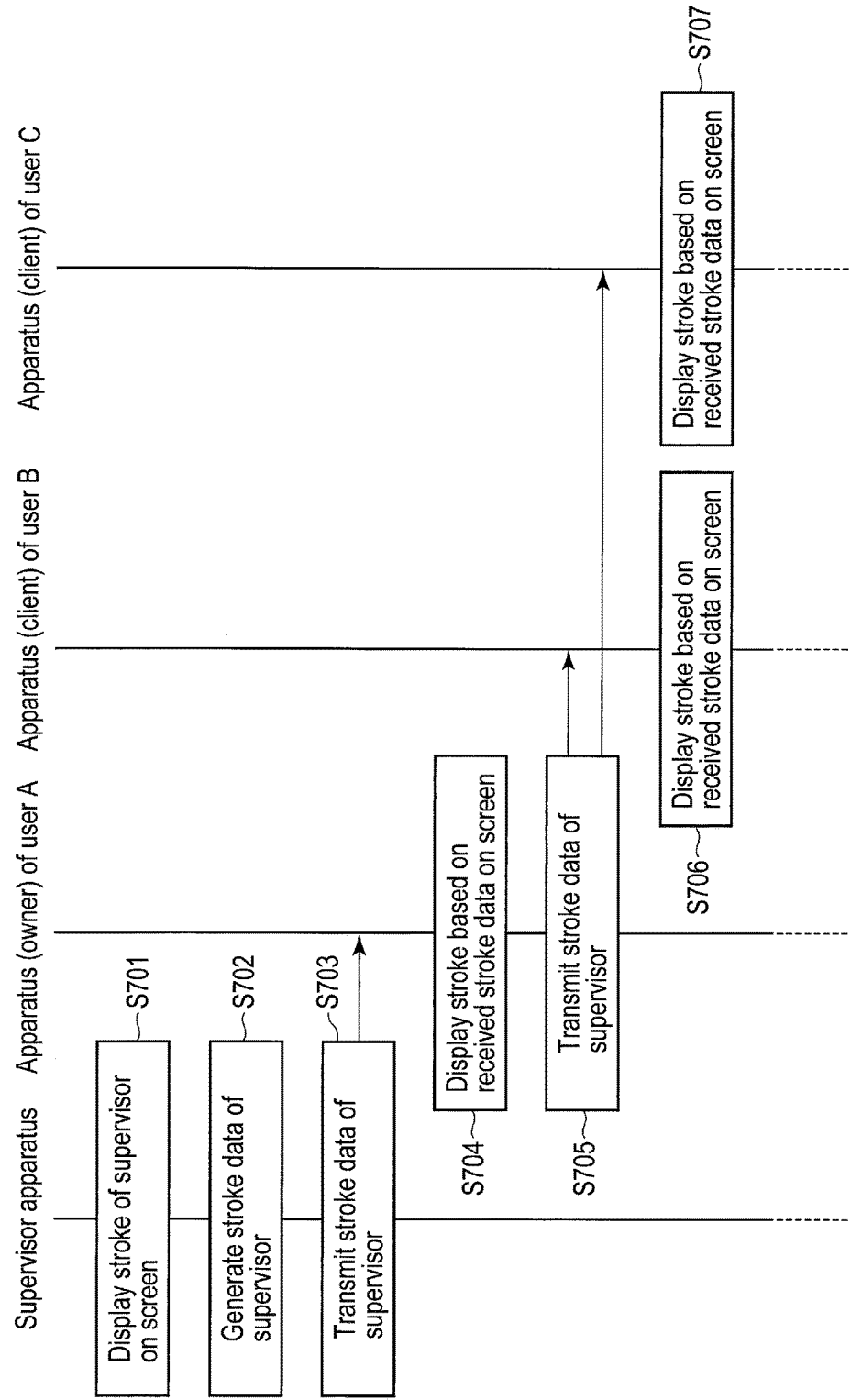
FIG. 17 is a view for explaining an example of the procedure of processing in the case where the electronic apparatus of the embodiment participates in a group during the handwriting sharing service in the case where the user apparatus as indicated in FIG. 10 is the owner.
Figure 18:
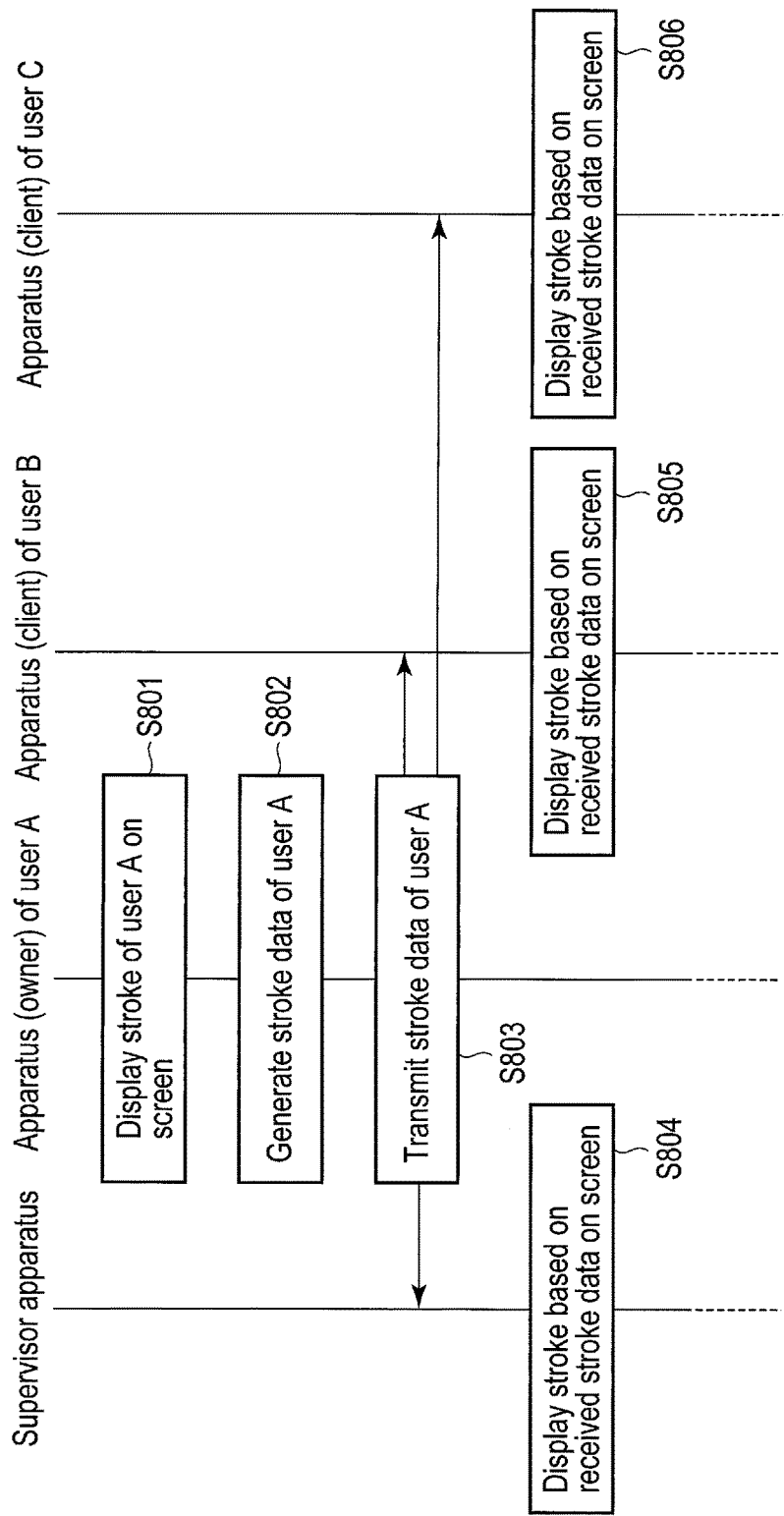
FIG. 18 is a view for explaining an example of another procedure of the processing in the case where the electronic apparatus of the embodiment participates in the group during the handwriting sharing service in the case where the user apparatus as indicated in FIG. 10 is the owner.
Figure 19:
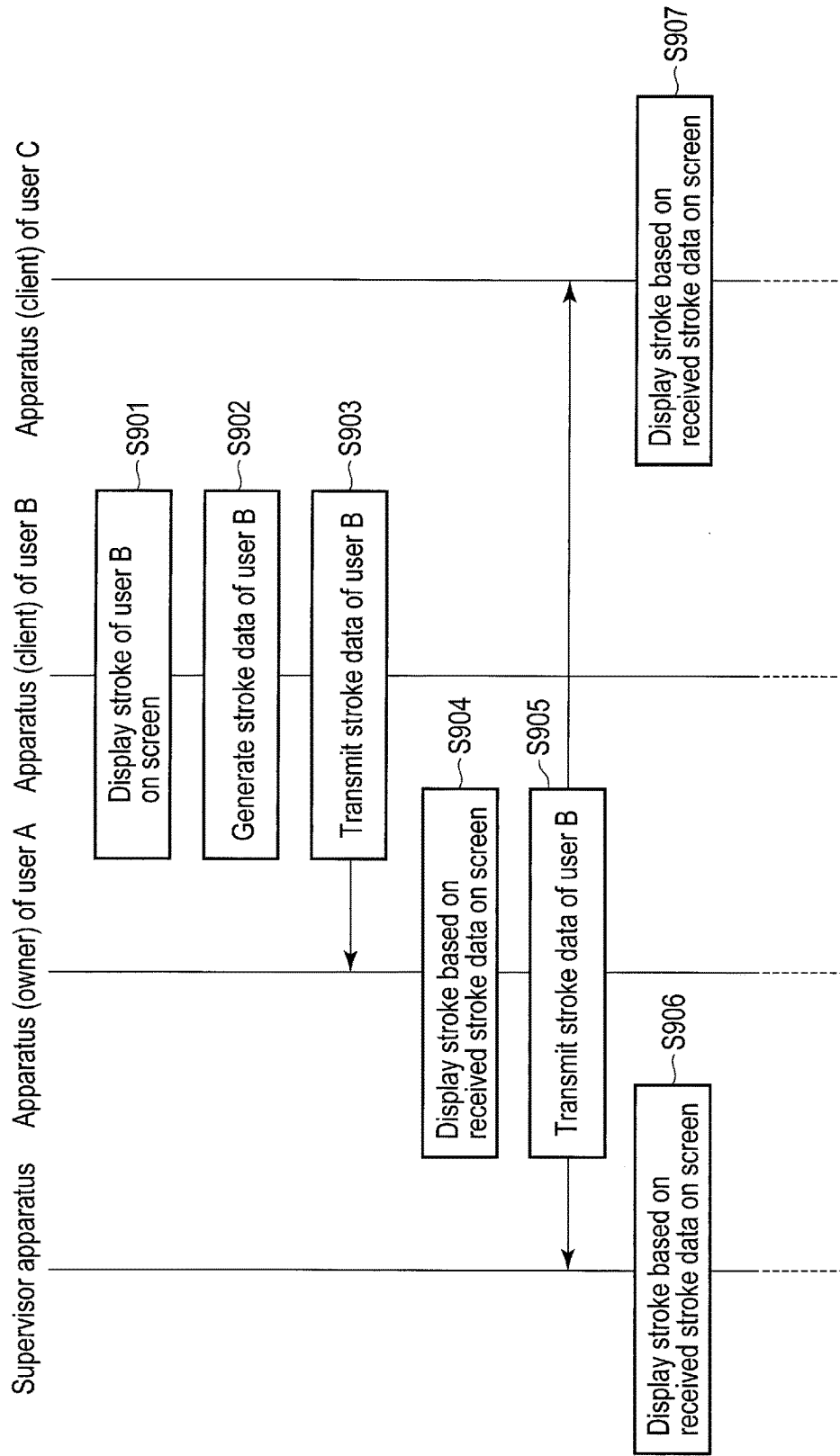
FIG. 19 is a view for explaining an example of still another procedure of the processing in the case where the electronic apparatus of the embodiment participates in the group during the handwriting sharing service in the case where the user apparatus as indicated in FIG. 10 is the owner.

FIGS. 17 to 19 show processing of the supervisor apparatus 10S and the user apparatuses 10A, 10B and 10C in the case where the supervisor apparatus 10S participates in the first group.

First, processing to be executed in the case where a stroke is input by handwriting at the supervisor apparatus 10S will be explained by referring to an example shown in FIG. 17.

The supervisor apparatus 10S displays on the screen a stroke input by handwriting by the supervisor (S701), and generates stroke data corresponding to the stroke (S702). Then, the supervisor apparatus 10S transmits the generated stroke data to the user apparatus 10A which is the owner of the first group (S703).

The user apparatus 10A receives the stroke data from the supervisor apparatus 10S, and displays a stroke based on the received stroke data on the screen (S704). Then, the user apparatus 10A transmits the received stroke data to the user apparatuses 10B and 10C (S705).

The user apparatus 10B receives the stroke data from the user apparatus 10A, and displays a stroke based on the received stroke data on the screen (S706). Also, the user apparatus 10C receives the stroke data from the user apparatus 10A, and displays a stroke based on the received stroke data on the screen (S707).

Then, processing to be executed in the case where a stroke is input by handwriting at the user apparatus 10A which is the owner will be explained by referring to an example shown in FIG. 18.

The user apparatus 10A displays a stroke input by handwriting by the user A on the screen (S801), and generates stroke data corresponding to the stroke (S802). Then, the user apparatus 10A transmits the generated stroke data to the supervisor apparatus 10S and the user apparatuses 10B and 10C (S803).

The supervisor apparatus 10S receives the stroke data from the user apparatus 10A, and displays a stroke based on the received stroke data on the screen (S804). The user apparatus 10B receives the stroke data from the user apparatus 10A, and displays a stroke based on the received stroke data on the screen (S805). Also, the user apparatus 10C receives the stroke data from the user apparatus 10A, and displays a stroke based on the received stroke data on the screen (S806).

Furthermore, processing to be executed in the case where a stroke is input by handwriting at the user apparatus 10B which is a client (participant) will be explained by referring to an example shown in FIG. 19.

The user apparatus 10B displays the stroke input by handwriting by the user B on the screen (S901), and generates stroke data corresponding to the stoke (S902). Then, the user apparatus 10B transmits the generated stroke data to the user apparatus 10A which is the owner of the first group (S903).

The user apparatus 10A receives the stroke data from the user apparatus 10B, and displays a stroke based on the received stroke data on the screen (S904). Then, the user apparatus 10A transmits the received stroke data to the supervisor apparatus 10S and the user apparatus 10C (S905).

The supervisor apparatus 10S receives the stroke data from the user apparatus 10A, and displays a stroke based on the received stroke data on the screen (S906). Also, the user apparatus 10C receives the stroke data from the user apparatus 10A, and displays a stroke based on the received stroke data on the screen (S907).

It should be noted that also in the case where a stroke or strokes are input by handwriting at the user apparatus 10C which is another client in the first group, the equivalent processing as shown in FIG. 19 is executed.

By virtue of the processing as shown in FIGS. 17 to 19, not only the stroke input by handwriting at each of the supervisor apparatus 10S and the user apparatuses 10A, 10B and 10C, but also the stroke input by handwriting at another or other apparatuses can be displayed on the display of each of the apparatuses 10S, 10A, 10B and 10C.

Figure 20:
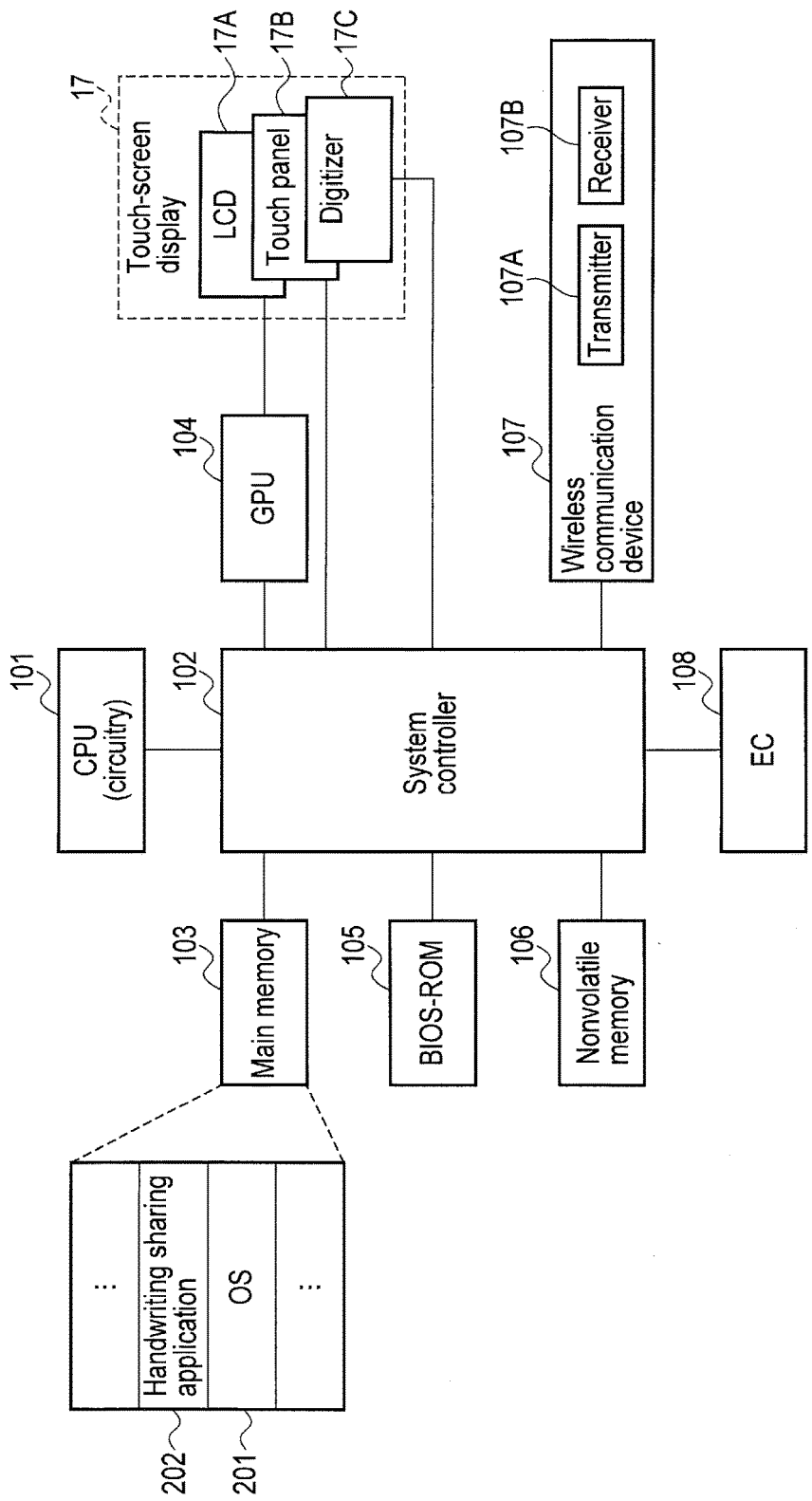
FIG. 20 is an exemplary block diagram showing a system configuration of the electronic apparatus of the embodiment.

FIG. 20 is a view showing a system configuration of the tablet computer 10. As described above, the tablet computer 10 can operate as any of the supervisor apparatus 10S and the user apparatuses 10A, 10B and 10C.

The tablet computer 10 includes a CPU 101, a system controller 102, a main memory 103, a graphics processing unit 104, a BIOS-ROM 105, a nonvolatile memory 106, a wireless communication device 107, an embedded controller (EC) 108, etc.

The CPU 101 is a processor which controls operations of various components in the tablet computer 10. The processor includes circuitry (processing circuitry). The CPU 101 executes various programs loaded from the nonvolatile memory 106, which is a storage device, into the main memory 103. Those programs include an operating system (OS) 201 and various application programs. The application programs include a handwriting sharing application program 202. The handwriting sharing application program 202 can perform a function for managing a group which shares handwritten information and a function for causing handwritten information to be shared among user apparatuses in the group.

The CPU 101 also executes a basic input and output system (BIOS) stored in the BIOS-ROM 105. The BIOS is a program for hardware control.

The system controller 102 is a device which connects a local bus of the CPU 101 to various components. The system controller 102 incorporates a memory controller which performs access control to the main memory 103. Also, the system controller 102 has a function of executing communication with the graphics processing unit (GPU) 104 through a serial bus or the like conforming to PCI EXPRESS standards.

The GPU 104 is a display processor (display control circuitry) which controls an LCD 17A serving as a display monitor of the tablet computer 10. A display signal generated by the GPU 104 is sent to the LCD 17A. The LCD 17A displays a screen image in accordance with the display signal. On an upper surface of the LCD 17A, a touch panel 17B is provided. On a lower surface of the LCD 17A, a digitizer 17C is provided. The touch panel 173 is a capacitive pointing device configured to perform inputting on the screen of the LCD 17A. A touch position on the surface of the screen which is touched by a finger, a motion of the touch position, etc. are detected by the touch panel 173. The digitizer 17C is an electromagnetic induction-type pointing device configured to perform inputting on the screen of the LCD 17A. The digitizer 17C detects the position (touch position) on the surface of the screen to which a pen 100 is touched, motion of the touch position, etc.

The wireless communication device 107 is a transceiver configured to execute wireless communication. The wireless communication device 107 includes a transmitter 107A which wirelessly transmits a signal and a receiver 107B which wirelessly receives a signal. The EC 108 is a one-chip microcomputer including an embedded controller for power management. The EC 108 has a function of powering on or off the tablet computer 10 in accordance with an operation of a power button by the user.

Figure 21:
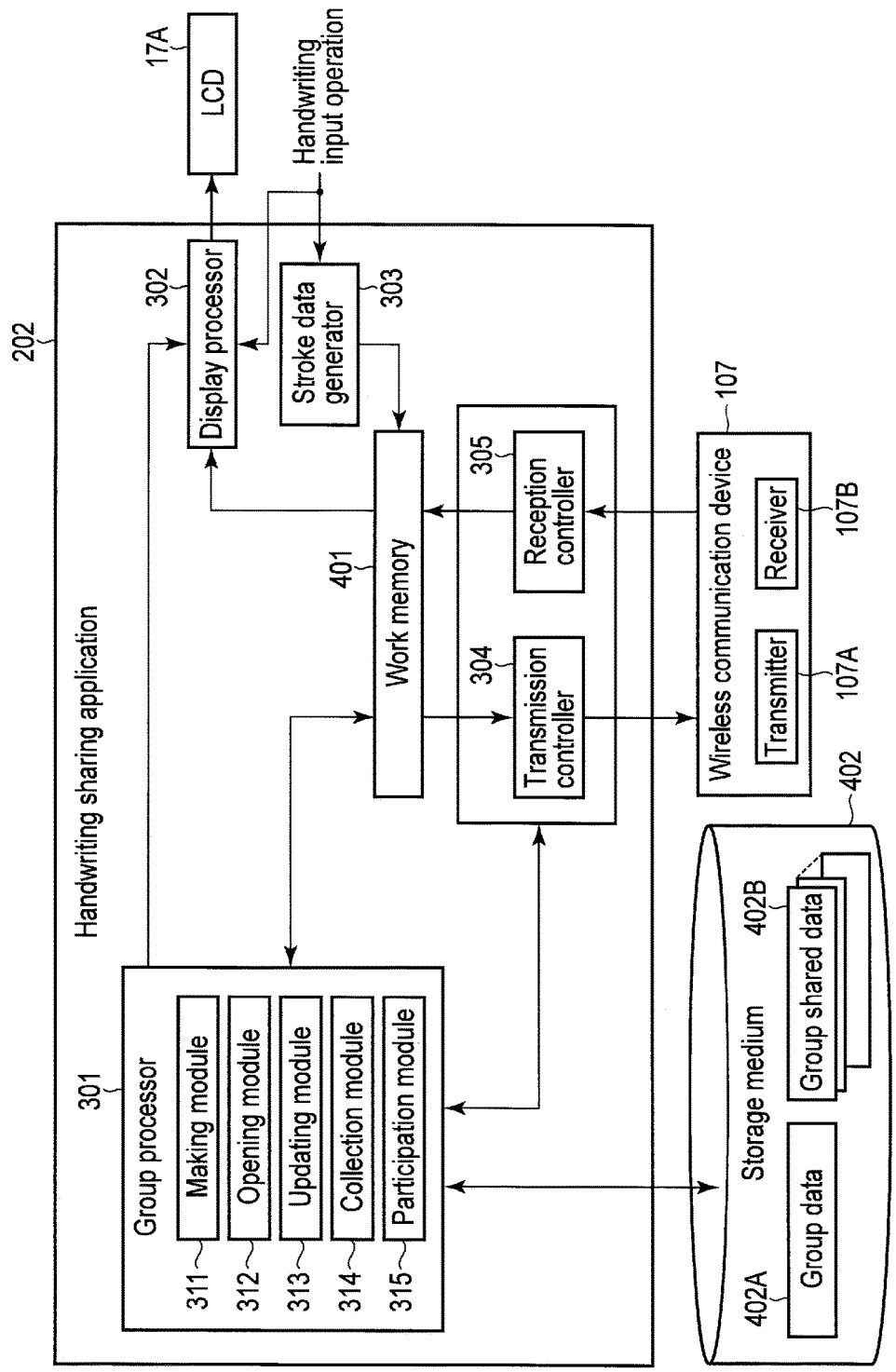
FIG. 21 is an exemplary block diagram showing a functional configuration of a handwriting sharing application program to be executed by the electronic apparatus of the embodiment.

Next, the configuration of the handwriting sharing application program 202 will be explained with reference to FIG. 21. The handwriting sharing application program 202 operates in either a supervisor mode for managing a group or a user mode for sharing handwritten information in the group. That is, the supervisor apparatus corresponds to an electronic apparatus 10 in which the handwriting sharing application program 202 is executed to operate in the supervisor mode, and the user apparatus corresponds to an electronic apparatus 10 in which the handwriting sharing application program 202 is executed to operate in the user mode.

The handwriting sharing application program 202 includes a group processor 301, a display processor 302, a stroke data generator 303, a transmission controller 304, a reception controller 305, etc. as function execution modules for managing groups and sharing handwritten information in each group.

The following explanation is given with respect to the case where the handwriting sharing application program 202 operates in the supervisor mode.

The group processor 301 manages a group in which the handwriting sharing service is executed. The group processor 301 includes a making module 311, an opening module 312, an updating module 313, a collection module 314, a participation module 315, etc.

The making module 311 executes processing for making a group. The making module 311 makes a group in which the supervisor apparatus 10S is an owner, and generates an entry of group data 402A associated with the group.

In the made group, data is shared according to a scheme. The making module 311 creates a canvas (shared screen) to be shared in the group. The display processor 302 displays the canvas in an initial state (for example, blank canvas) on the screen. The supervisor may perform an operation for locating on the canvas, content (teaching material or the like) to be delivered to users of the group. The making module 311 locates, when content to be located on the canvas is selected, the selected content on the canvas. The content includes a document, an image or the like.

It should be noted that on the canvas, a stroke may be drawn in accordance with a handwriting input operation by the supervisor. The touch-screen display 17 (the digitizer 17c or the touch panel 17B) is configured to detect an occurrence of an event such as "touch", "movement (slide)" or "release". "Touch" is an event indicating that an external object has contacted the surface of the screen. "Movement (slide)" is an event indicating that the touch position has been moved while the external object is in contact with the screen. "Release" is an event indicating that the external object has been separated from the screen.

The display processor 302 and the stroke data generator 303 receive the event "touch", "movement (slide)" or "release" which occurs at the touch-screen display 17, and thereby detects the handwriting input operation. The event "touch" includes coordinates of the touch position. The event "movement (slide)" includes coordinates of a location to which the touch position has been moved. The event "release" includes coordinates of a position at which the touch position has been separated from the screen. Therefore, the display processor 302 and the stroke data generator 303 can receive from the touch screen display 17, a coordinate string corresponding to the locus of the movement of the touch position.

The display processor 302 displays one or more strokes, which are input by handwriting on the screen of the touch-screen display 17, on the canvas. The display processor 302 receives a coordinate string from the touch-screen display 17, and displays the locus of each of strokes, which are handwritten by a handwriting input operation using the pen 100 or the like, on the canvas based on the coordinate string.

The stroke data generator 303 receives the above coordinate string output from the touch-screen display 17, and generates time-series information (stroke data) having such a structure as explained in detail with reference to FIG. 8, based on the coordinate string. In this case, the time-series information, i.e., coordinates corresponding to each of points of the stroke, time stamp information, pen type information and pen pressure may be temporarily stored in a work memory 401.

It should be noted that the canvas may be made up of pages. On each of the pages, for example, teaching materials (subjects) for use in a single class can be placed, respectively. The making module 311 selects a page in response to a predetermined operation for page selection (for example, a tapping operation on a button to change a page on the screen), and on the selected page, content is placed or a stroke is drawn.

The making module 311 generates group shared data 402B corresponding to the created canvas, and stores it in a storage medium 402 or the like. Since another electronic apparatus participating in the group can also display a canvas (screen image) identical to the above canvas, using the group shared data 402B, the canvas can be shared in the group.

FIG. 22 shows a configuration example of the group data 402A.

The group data 402A includes entries associated with groups. An entry associated with a given group includes, for example, group ID, group name, owner ID, participant ID, state, thumbnail image, etc. The "group ID" indicates identification information given to the group. "Group name" indicates a name given to the group. As "group name", not only a group name such as "first group" or "second group" but information indicating content to be handled by the group (for example, a teaching material or a subject accompanied by cooperative operations of users of the group) may be applied.

"Owner ID" indicates identification information given to a user organizing the group. It should be noted that as the "owner ID", identification information given to an electronic apparatus used by the user organizing the group may be set. "Participant ID" indicates identification information given to a user participating in the group (or identification information given to an electronic apparatus used by the user).

"State" indicates the state of the group, and for example, is set as "open" indicating that the user is able to participate in the group or "closed" indicating that the user is not able to participate in the group. "Thumbnail image" indicates a thumbnail image of the screen (canvas) shared in the group or a file pass to the thumbnail image.

It should be noted that the group data 402A may include information such as the date and time of generation or the date and time of update.

FIG. 23 shows a configuration example of the group shared data 402B. The group shared data 402B are stored for each group. For example, the group shared data 402B for each group is associated with respective identification information (group ID). Therefore, with respect to given group shared data 402B, it is possible to specify which group has the group shared data 402B.

The group shared data 402B includes entries associated with strokes. To be more specific, an entry associated with a given stroke includes, for example, a stroke ID, a user ID, stroke data, time, pen type, color, width, degree of transparency, etc. "Stroke ID" indicates identification information given to the stroke. "User ID" indicates identification information given to a user who has input by handwriting the stroke. Instead of "user ID", identification information (device ID) given to an electronic apparatus used to input by handwriting the stroke may be applied. "Stroke data" indicates a coordinate string corresponding to the stroke. "Time" indicates time at which the stroke was handwritten or time at which stroke data was received by another user apparatus. "Pen type", "color", "width" and "degree of transparency" are attribute information regarding the stroke.

It should be noted that although FIG. 23 shows an example of the group shared data 402B in the case where handwritten strokes are drawn on the canvas shared in the group, the group shared data 402B may include data of content (for example, an image or a document) located on the canvas, data indicating the location of the content on the canvas, etc.

Also, the making module 311 can further make a new group by editing a made group. For example, in the case where groups are given the same teaching material, the making module 311 restarts editing of a first group which has already been made, changes the name of the first group to the name of the new group and stores the edited first group as a second group. Thereby, the new group is made as the second group. In such a manner, the supervisor can easily make groups to be given the same teaching material.

The display processor 302 displays a list of made groups on the screen.

The opening module 312 executes processing for opening a made group, i.e., processing for starting a handwriting sharing service for the group according to a scheme. For example, if the opening module 312 is instructed to open a made group, it opens the group as a provisional owner (server) using group shared data 402B of the group. In order that the following explanation be easily understood, it is given with respect to the case where the first group is opened.

The opening module 312 gives notification indicating an opened group. To be more specific, upon reception of a query regarding which group is opened, from a user apparatus, through a reception controller 305, the opening module 312 notifies the user apparatus of an opened group through a transmission controller 304.

Then, the opening module 312 awaits a request for participation in the group from the user apparatus (client) through the reception controller 305. The opening module 312 transmits the group shared data 402B of the first group to the user apparatus 10A, which first makes a request for participation in the first group, through the transmission controller 304. It should be noted that the opening module 312 may transmit an entry in the group data 402A, which is associated with the first group, to the user apparatus 10A, through the transmission controller 304. To be more specific, when receiving a request for participation in the first group from the user apparatus 10A, the opening module 312 stores an IP address of the user apparatus 10A. Based on this IP address, the transmission controller 304 transmits the group shared data 402B of the first group to the user apparatus 10A. The user apparatus 10A receives the group shared data 402B of the first group, and stores it in the local database 12A.

Next, in the case where the user apparatus 10A participates in the first group (for example, an acknowledgment of receipt of the group shared data 402B is received from the user apparatus 10A through the reception controller 305), the opening module 312 will close the first group. The opening module 312 notifies the user apparatus 10A through, for example, the transmission controller 304, that the first group will be closed, and then closes the first group after the user apparatus 10A exits from the first group. Then, the opening module 312 requests the user apparatus 10A to open the first group, which was opened and closed, through the transmission controller 304, based on the IP address stored in the user apparatus 10A.

In response to this request, the user apparatus 10A, which was a client, opens the first group as an owner. The user apparatus 10A executes a handwriting sharing service for the first group, using the group shared data 402B of the first group received from the supervisor apparatus 10S. Thereby, the first group which the supervisor apparatus 10S previously opened as a provisional owner, can be opened by the user apparatus 10A, which first participates in the first group.

The display processor 302 displays a list of opened groups. The list includes thumbnail images associated with the opened groups.

The updating module 313, the collection module 314 and the participation module 315 execute processing for managing the opened groups.

The updating module 313 executes processing for updating the thumbnail images associated with the opened groups and displayed on the screen. While a user apparatus of an owner is executing a handwriting sharing service for the group, the updating module 313 requests the user apparatus to transmit a thumbnail image of a canvas (shared screen) to be shared in the group and receives the thumbnail image of the canvas from the user apparatus, through the transmission controller 304 and the reception controller 305. Using the received thumbnail image, the display processor 302 updates the thumbnail image of an associated group displayed on the screen. It should be noted that in the case where the group has been closed, the display processor 302 deletes the thumbnail image of the group on the screen.

The collection module 314 executes processing for collecting group shared data shared in an opened group. The collection module 314 (the supervisor apparatus 10S) temporarily participates in the group whose group shared data is to be collected, and thereby receives the group shared data of the group. To be more specific, the collection module 314 requests through the transmission controller 304 a user apparatus which is an owner of the group, to permit the supervisor apparatus 10S to participate in the group, and receives the group shared data of the group through the reception controller 305. The collection module 314 stores the received group shared data in the storage medium 402 (local database 12S). On the display of the supervisor apparatus 10S, a list of histories of the group is displayed. Based on the received group shared data, the display processor 302 may add a new item to the list, or may update a corresponding item of the list. After collecting the group shared data, the collection module 314 notifies the user apparatus of the owner that the supervisor apparatus 10S will exit from the group.

Also, the participation module 315 executes processing for causing the supervisor apparatus 10S to participate in the opened group. To be more specific, if participation in the opened group is requested, the participation module 315 requests through the transmission controller 304, the owner apparatus for the group to permit the supervisor apparatus 10S to participate in the group. Furthermore, the participation module 315 receives group shared data transmitted from the owner apparatus through the reception controller 305, and stores it in the storage medium 402 (local database 12S). Using the group shared data, the display processor 302 displays a canvas (shared screen) shared in the group.

If a handwriting input operation is performed on the canvas (shared screen), the display processor 302 displays a stroke corresponding to the handwriting input operation on the canvas. The stroke data generator 303 generates stroke data corresponding to the stroke, and the transmission controller 304 transmits the generated stroke data to the owner apparatus.

The reception controller 305 receives the stroke data from the owner apparatus, and the display processor 302 displays the stroke corresponding to the received stroke data on the canvas.

Furthermore, in the case where the canvas (shared screen) for the group includes pages, the display processor 302 changes the page to be displayed, in accordance with a predetermined operation on the shared screen (for example, a tapping operation on a button for changing the page which is displayed on the screen). Then, the transmission controller 304 notifies the owner apparatus of this page change. The reception controller 305 receives notification indicating the page change from the owner apparatus, and the display processor 302 changes the page to be displayed, based on the received notification.

It should be noted that in the case where the supervisor apparatus 10S is caused by the participation module 315 to exit from the group, the display processor 302 changes the group shared screen being displayed to a screen including a list of thumbnail images of opened groups and a list of histories of the groups.

The supervisor can ascertain the state of an opened group, as described above, by updating the thumbnail image associated with the opened group, collecting group shared data shared in the opened group or participating in the opened group. Furthermore, the supervisor apparatus 10S can manage the group simply by communicating with the user apparatus operating as the owner (server), without becoming the owner, as a result of which the load on the processing of the supervisor apparatus 10S can be reduced.

It should be noted that after the group opened by the owner apparatus is closed (i.e., the handwriting sharing service for the group executed by the owner apparatus is ended), the opening module 312 can also re-open the group (execute the handwriting sharing service) using group shared data. The group shared data is received from the owner apparatus because of the processing by the collection module 314 and the participation module 315. The opening module 312 re-opens the group from the time at which the group shared data is received from the owner apparatus. The opening module 312 specifies group shared data 402B stored in the local database 12A (the storage medium 402) of the supervisor apparatus 10S based on, for example, identification information (group ID) given to the group. Therefore, for example, even when suddenly, a network is shut off or a system failure occurs in the owner apparatus, it is possible to re-start the service for the group, using the stored group shared data 402B, without losing the result obtained by a cooperative operation of user apparatuses of the group.

The following explanation is given with respect to the case where the handwriting sharing application program 202 operates in a user mode.

The participation module 315 multicasts a search request for searching for an opened group, through the transmission controller 304. The participation module 315 receives the search request through the reception controller 305, and the display processor 302 displays a list of opened groups on the screen, based on the result of the search. The participation module 315 issues through the transmission controller 304 a request for participation in a group selected from the displayed list, to an owner apparatus of the group.

The participation module 315 receives group shared data 402B of the group through the reception controller 305. The display processor 302 displays a shared screen of the group using the received group shared data 402B.

If the owner apparatus is the supervisor apparatus 10S and the participation module 315 receives from the supervisor apparatus 10S a notification indicating closing of the group through the reception controller 305, a user apparatus including the participation module 315 exits from the group. Then, when the opening module 312 is requested by the supervisor apparatus 10S (owner apparatus) to open the group from which the above user apparatus exits, through the reception controller 305, the user apparatus opens the group as an owner, using the group shared data 402B received from the supervisor apparatus 10S. The display processor 302 displays a canvas (shared screen) based on the group shared data 402B.

The opening module 312 awaits a request from a client apparatus for participation in the group through the reception controller 305. Then, the opening module 312 transmits the group shared data 402B to the client apparatus through the transmission controller 304.

Further, when the opening module 312 receives from the supervisor apparatus 10S a request for a thumbnail image of a shared screen of the group through the reception controller 305, it generates a thumbnail image of a shared screen of the group. The transmission controller 304 transmits the generated thumbnail image to the supervisor apparatus 10S.

Furthermore, when a handwriting input operation is performed on the shared screen, the display processor 302 displays a stroke corresponding to the handwriting input operation on the shared screen. The stroke data generator 303 generates stroke data corresponding to the stroke. The transmission controller 304 of a client apparatus transmits the generated stroke data to the owner apparatus. On the other hand, the transmission controller 304 of an owner apparatus transmits the generated stroke data to the client apparatus.

Furthermore, the reception controller 305 of a client apparatus receives stroke data from the owner apparatus, and the display processor 302 displays a stroke corresponding to the received stroke data on the shared screen. On the other hand, the reception controller 305 of an owner apparatus receives stroke data from a client apparatus, the display processor 302 displays a stroke corresponding to the received stroke data on the shared screen, and the transmission controller 304 transmits the stroke data to another client apparatus.

By virtue of the above structure, apparatuses can share handwritten information as an owner or a client.

Furthermore, an owner apparatus is possible to execute the following page changing processing: in the case where the shared screen (canvas) of the group is made up of pages, the display processor 302 changes the page to be displayed, in accordance with a predetermined operation performed on the shared screen. Then, the transmission controller 304 notifies the client apparatus of this page change. The client apparatus receives from the owner apparatus a notification indicating the page change, and changes the page to be displayed, based on the received notification.

Furthermore, the reception controller 305 receives from the supervisor apparatus 10S a notification indicating the page change, and the display processor 302 changes the page to be displayed, based on the received notification. Then, the transmission controller 304 notifies the client apparatus of this page change. The client apparatus receives from the owner apparatus a notification indicating the page change, and changes the page to be displayed, based on the received notification.

FIG. 24 shows an example of a group making screen (screen image) including a change button for changing the mode to a supervisor mode (teacher mode). The group making screen 51 includes a setting menu list 51A, a "group making" button 512, a "menu" button 513, etc., the setting menu list 51A including a "teacher mode" button 511.

The "menu" button 513 is a button for displaying various menus such as the setting menu list 51A.

The "teacher mode" button 511 is a button for changing the mode of the handwriting sharing application program 202 from a user mode in which the handwriting sharing application program 202 is used by a user (for example, a student) to a supervisor mode in which the handwriting sharing application program 202 is used by a supervisor (for example, a teacher). As described above, in the user mode, the handwriting sharing application program 202 is used to cause handwritten information to be shared in a group, and in the supervisor mode, it is used to manage the group which shares the handwritten information. It may be set such that when for example, the "teacher mode" button 511 is tapped, a dialog box for inputting a passcode is displayed, and only a supervisor (teacher) who knows a correct passcode is permitted to instruct the mode to be switched to the supervisor mode.

The "group making" button 512 is a button for starting making a group which is to share handwritten information.

FIG. 25 shows a screen (screen image) 52 which is displayed when for example, the "teacher mode" button 511 in the screen 51 as shown in FIG. 24 is tapped. In the screen 52, a text 521, etc., are displayed, the text 521 indicates that the handwriting sharing application program 202 is in the teacher mode (supervisor mode).

The supervisor (teacher) can start to make a group of users which are to be made to share handwritten information, by tapping the "group making" button 512 in the screen 52. In the case where a group is made, an item 515, 516 or 517 indicating the group is displayed (added) in the list 52A. In each of the items 515, 516 and 517, an image associated with the group (for example, thumbnail image of a canvas shared in the group), the name (title) of the group, information regarding an owner of the group, information regarding a participant of the group, the date and time when the group was made, etc., may be displayed.

FIG. 26 shows a canvas generation screen (screen image) 53 for generating a canvas (shared screen) to be initially shared in a group in the case where the group is made by the supervisor apparatus 10S. The canvas generation screen 53 includes a preview area 531 in which a canvas being generated is to be displayed, various tool buttons 532 for generating (editing) a canvas, an "exit" button 533, a "save" button 534, an "insert" button 536, a "template" button 537, an "open" button 538, etc.

The tool buttons 532 include pen tool buttons indicating various pens for drawing and editing a stroke by performing a handwriting input operation on the preview area 531 in a canvas, an eraser tool button, an area selecting tool button, etc.

The "exit" button 533 is a button for causing an apparatus to exit from the group being made, i.e., a button for ending making of the group. The "save" button 534 is a button for saving data regarding the group being made. To be more specific, when for example, the "save" button 534 is tapped, the group data 402A and the group shared data 402B associated with the group being made are saved.

The "delete" button 535 is a button for deleting the data regarding the group being made. The "insert" button 536 is a button for locating generated content (a text, a handwritten text, an image or the like) on the canvas. The "template" button 537 is a button for pasting content prepared in advance or the like on the canvas, based on templates. The "open" button 538 is a button for starting execution of handwriting sharing service for the group.

A teacher serving as a supervisor can locate on the canvas a teaching material to be delivered to students (users), by operating the tool buttons 532, the "insert" button 536, the "template" button 537, or the like, in the canvas generation screen 53.

FIG. 27 shows a screen (screen image) 54 in the case where a group is opened after making the group and a canvas to be shared in the group. The supervisor selects any of items 515, 516 and 517, which are associated with made groups, from the list 52A of the groups displayed in the screen 54, and taps the "open" button 538. In accordance with this operation, the group or groups associated with the selected one or ones of items 515, 516 and 517 are opened (that is, the handwriting sharing service for the opened group or groups is started), and those of items 541, 542 and 543 which are associated with the opened groups, an "update" button 551 and a "collect" button 552 which are buttons for managing the opened group or groups are displayed in the screen 54.

In the items 541, 542 and 543 which are associated with the opened groups, thumbnail images of canvases to be shared in the groups are included. Also, in the items 541, 542 and 543, names (titles) of the groups, information regarding owners of the groups, participants of the groups, etc., may be included. When any of items 541, 542 and 543 is tapped, a request for participation in an associated group is made to an owner apparatus of the associated group.

Furthermore, the "update" button 551 is a button for updating the thumbnail images in the items 541, 542 and 543 associated with the opened groups. When the "update" button 551 is tapped, the thumbnail images in the items 541, 542 and 543 are updated. Thus, a supervisor (teacher) can ascertain the states of cooperative operations of the groups by viewing the present canvases of the groups.

The "collect" button 552 is a button for acquiring present shared data of an opened group. When the "collect" button 552 is tapped, the supervisor apparatus 10S receives present shared data of the opened group from the owner apparatus of the opened group. Using the received shared data, the supervisor apparatus 10S updates that of items 515, 516 and 517 in the list 52A, which is associated with the opened group.

It should be noted that the supervisor apparatus 10S may newly add an item associated with the received shared data to the list 52A of groups. In this case, the list 52A can be used as a list of histories of sharing of handwritten information by the groups. The supervisor apparatus 10S can arrange or filter the items in the list 52A in an order based on the names of the groups or the dates and times when the groups were made.

FIG. 28 shows an example of a screen (screen image) 61 to be displayed when the handwriting sharing application program 202 is started in each of the user apparatuses 10A, 10B and 10C. The screen 61 includes a "group making" button 611 and buttons 612, 613 and 614 each indicating whether an associated group is opened.

When a user (student) taps one of the buttons 612, 613 and 614, which is associated with a group in which the user wishes to participate, an associated one of the user apparatuses 10A, 10B and 10C requests the owner apparatus of the group associated with the tapped button to permit the user to participate in the group. Thereby, the user can participate in the group, and utilize the handwriting sharing service for the group.

It should be noted that although the displayed screen 61 includes the "group making" button 611, the user (student) has only to participate in a group made by the supervisor (teacher), and thus does not need to make a group. Also, in order to prevent the user (student) from operating the "group making" button 611 by mistake, it may be set that "group making" button 611 is not displayed in the screen 61.

FIG. 29 shows an example of a screen (screen image) 62 to be displayed on each of displays of the user apparatuses 10A, 10B and 10C participating in a group. The screen 62 includes a canvas 621 to be shared in the group, various tool buttons 622 for performing a handwriting input operation on the canvas 621, etc. The tool buttons 622 include, for example, various pen tools for drawing and editing a stroke by performing a handwriting input operation on the canvas 621, an eraser tool, an area selection tool, etc Next, with reference to the flowchart of FIG. 30, an example of the procedure of group making processing to be executed by the supervisor apparatus 10S will be explained.

First, the making module 311 determines whether an instruction to make a group has been given (block B101). Whether an instruction to make a group has been given is determined based on, for example, whether a button for making a group on the screen has been pressed (i.e., it has been tapped or not). If an instruction to make a group has not been given (No in block B101), the processing returns to block B101, and it is re-determined whether an instruction to make a group has been given.

If an instruction to make a group has been given (Yes in block B101), the making module 311 makes a group (block B102). In this case, for example, the making module 311 makes a group in which the supervisor apparatus 10S is an owner apparatus, and generates an entry of group data 402A associated with the group. Then, the making module 311 generates a canvas (shared screen) to be shared in the made group (block B103). The display processor 302 displays the canvas in an initial state on the screen. The supervisor can perform an operation for locating on the canvas, a teaching material or the like to be delivered to users of the group.

The making module 311 determines whether a teaching material to be located on the canvas has been selected (block B104). If no teaching material has been selected (No in block B104), the processing proceeds to block B106. If a teaching material has been selected (Yes in b lock B104), the making module 311 locates the selected teaching material on the canvas (block B105). It should be noted that in addition to the teaching material, the making module 311 can locate a text, an image or the like on the canvas; and it can also draw a stroke on the canvas in accordance with a handwriting input operation by the supervisor. The making module 311 generates group shared data 402B corresponding to the generated canvas. Using the group shared data 402B, in another or other electronic apparatuses participating in the group, canvases identical to the above generated canvas can be displayed. That is, the group can share the same canvas (screen image).

Next, the making module 311 determines whether to exit from the group, i.e., whether to end making of the group (block B106). If it determines not to exit from the group (No in block B106), the processing returns to block B104, and the making module 311 continues to edit the group by, for example, locating a teaching material.

If the making module 311 determines to exit from the group (Yes in block 106), it ends making of the group, and determines whether to make another group (block B107). If it determines to make another group (Yes in block B107), the processing returns to block 3101, and it starts to make new group. If it determines not to make another group (No in block N107), it ends the processing.

The flowchart of FIG. 31 shows an example of a group opening processing by the supervisor apparatus 10S.

The display processor 302 displays a list of groups which can be opened (i.e., groups generated in the above group making processing) on the screen (block B201). The opening module 312 determines whether at least one group has been selected from the displayed list of groups (block B202). The opening module 312 determines that a group to be opened has been selected from the list of groups, for example, if an operation for tapping the group in the list has been detected. If no group has been selected (No in block B202), the processing returns to block B202, and it is re-determined whether a group has been selected.

If at least one group has been selected (Yes in block B202), the opening module 312 determines whether an instruction to open the selected group has been given (block B203). The opening module 312 determines that an instruction to open the selected group has been given, if a button displayed on the screen for giving an instruction to open a group has been pressed (tapped). If an instruction to open the selected group has not been given (No in block B203), the processing returns to block B203, and it is re-determined whether an instruction to open the selected group has been given.

If an instruction to open the selected group has been given (Yes in block B203), the opening module 312 provisionally opens the group (B204). That is, the opening module 312 sets a group instructed to be opened such that a client (user apparatus) can participate in the group. Next, the display processor 302 displays a thumbnail image of a canvas (shared screen) of the opened group on the screen (block B205). The display processor 302 adds a thumbnail image of the opened group to a list of thumbnail images of opened groups which is being displayed.

Then, the opening module 312 determines whether a request for participation in the group has been received from a client (user apparatus) through a reception controller 305 (block B206). If a request for participation in the group has not been received (No in block B206), the processing returns to block B206, and it is re-determined whether a request for participation in the group has been received.

If a request for participation in the group has been received (Yes in block B206), the opening module 312 transmits group shared data 402B for the group to the client through the transmission controller 304 (block B207). Then, the opening module 312 determines whether the client has participated in the group (block B208). The opening module 312 determines that the client has participated in the group, for example, if the reception controller 305 has received from the client an acknowledgment of receipt of the group shared data 402B.

If the client has not participated in the group (No in block B208), the processing returns to block B208, and it is re-determined whether the client has participated in the group. In this case, the opening module 312 may re-transmit the group shared data 402B to the client through the transmission controller 304.

If the client has participated in the group (Yes in block B208), the opening module 312 notifies the client through the transmission controller 304 that the group will be closed (block B209), and closes the group (block B210). Then, the opening module 312 requests the client to open the group which was opened and closed (block B211).

In accordance with this request, the client (user apparatus) opens the group as an owner apparatus. Thereby, the user apparatus, which first participates in the group opened by the supervisor apparatus 10S as a Provisional owner apparatus, opens the group as an owner apparatus. Therefore, the supervisor apparatus 10S does not need to operate as the owner (server) apparatus of the group, and can manage the group simply by communicating with the user apparatus operating as the owner apparatus, thus reducing the load of the processing by the supervisor apparatus 10S.

The flowchart of FIG. 32 shows an example of the procedure of group participation processing by the user apparatus 10A in the case where the supervisor apparatus 10S is an owner apparatus.

First, the participation module 315 multicasts a request for searching for an opened group or groups, through the transmission controller 304 (block B301). The participation module 315 receives a result of searching for an opened group or groups through the reception controller 305, and using the result, the display processor 302 displays a list of opened groups on the screen (block B302). The participation module 315 receives from the supervisor apparatus 10S (owner apparatus), for example, information indicating that the first group is currently opened.

Then, the participation module 315 determines whether a group has been selected from the displayed list (block B303). If no group has been selected (No in block B303), the processing returns to block 2303, and it is re-determined whether a group has been selected from the list.

If a group has been selected (Yes in block B303), the participation module 315 requests through the transmission controller 304 the supervisor apparatus 10S (owner apparatus) to permit the user apparatus 10A to participate in the group (block 2304). Then, the participation module 315 receives shared data 402B of the group through the reception controller 305 (block B305). Using the received group shared data 402B, the display processor 302 displays a shared screen of the group on a screen of the user apparatus 10A (block 2306).

Next, the participation module 315 determines whether a notification indicating closing of the group has been made by the supervisor apparatus 10S (owner apparatus) through the reception controller 305 (block B307). If the notification indicating closing of the group has not been made (No in block B307), the processing returns to block B307, and it is re-determined whether a notification indicating closing of the group has been made.

If a notification indicating closing of the group has been made (Yes in block B307), the participation module 315 notifies the supervisor apparatus 10S (owner apparatus) that the user apparatus 10A will exit from the group through the transmission controller 304 (block B308).

Next, the opening module 312 determines whether a request for opening the above group has been made by the supervisor apparatus 10S (owner apparatus) through the reception controller 305 (block B309). If the request for opening the group has not been made (No in block B309), the processing returns to block B309, and it is re-determined whether a request for opening the group has been made.

If a request for opening the group has been made (Yes in block B309), the opening module 312 opens the group with the group shared data 402B received from the supervisor apparatus 10S (block B310). That is, the user apparatus 10A works as an owner apparatus.

Figure 33:
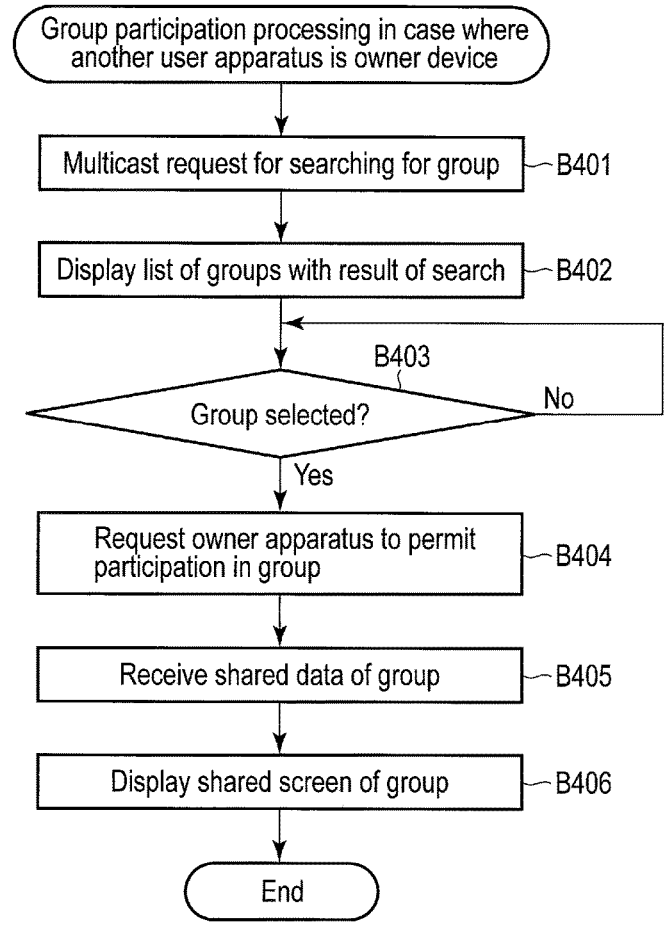
FIG. 33 is a flowchart showing an example of the procedure of group participation processing to be executed by the user apparatus using the handwriting sharing service in the case where another user apparatus is an owner.

The flowchart of FIG. 33 shows an example of the procedure of group participation processing by the user apparatuses 10B and 10C in the case where the user apparatus 10A is an owner apparatus.

First, the participation module 315 multicasts a search request for searching for an opened group or groups, through the transmission controller 304 (block B401). The participation module 315 receives a result of the search through the reception controller 305, and the display processor 302 displays a list of opened groups on the screen, using the result of the search (block B402). The participation module 315 receives from the user apparatus 10A (owner apparatus), information indicating, for example, that the first group is currently opened.

Then, the participation module 315 determines whether a group has been selected from the displayed list of groups (block B403). If no group has been selected (No in block B403), the processing returns to block B403, and it is re-determined whether a group has been selected from the list.

If a group has been selected (Yes in block B403), the participation module 315 requests the user apparatus 10A (owner apparatus) to permit the user apparatus 10B or 10C to participate in the group through the transmission controller 304 (block B404). Then, the participation module 315 receives shared data 402B of the group through the reception controller 305 (block B405). The display processor 302 displays the shared screen of the group using the received group shared data 402B (block B406).

Figure 34:
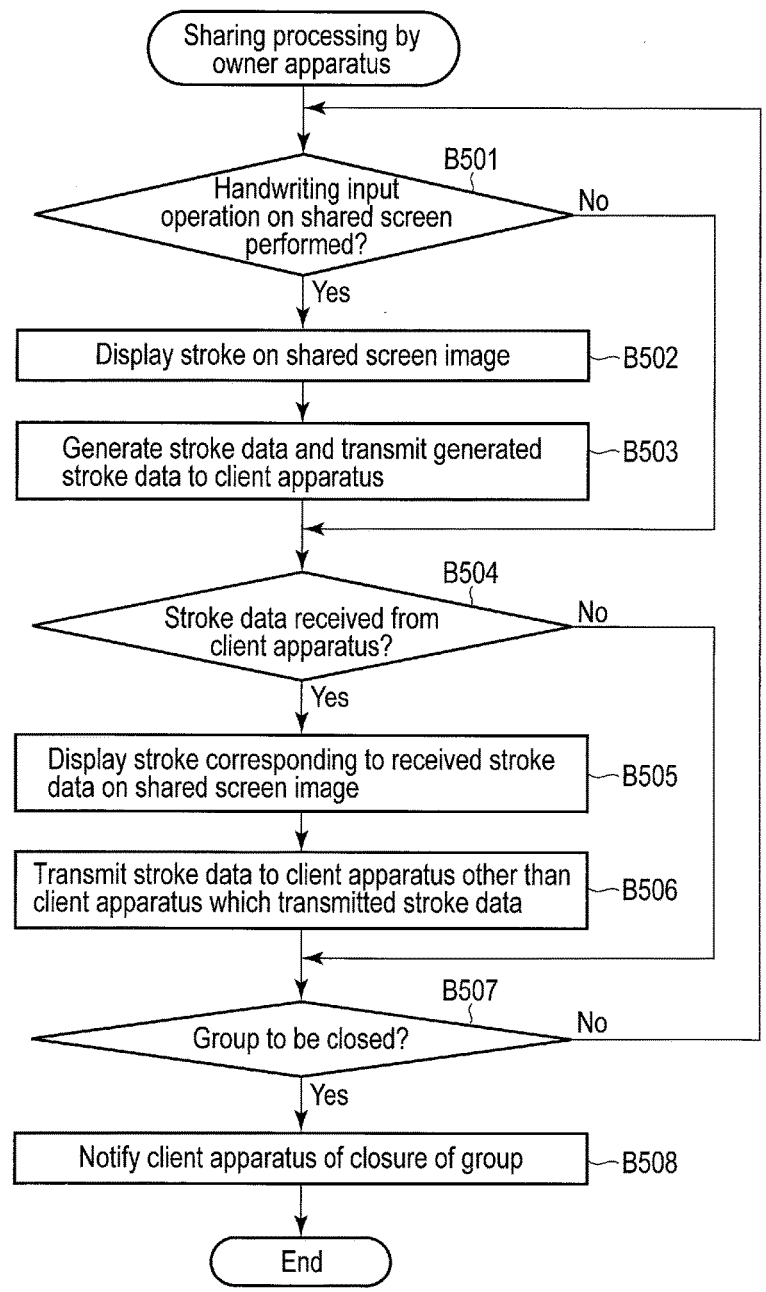
FIG. 34 is a flowchart showing an example of the procedure of the sharing processing to be executed by a user apparatus in the case where the user apparatus is an owner.

Next, with reference to the flowchart of FIG. 34, an example of the procedure of sharing processing to be executed by the owner apparatus will be explained. The owner apparatus is, for example, the user apparatus 10A which opens a group.

First, the display processor 302 and the stroke data generator 303 determine whether a handwriting input operation has been performed on a shared screen displayed on a screen of the owner apparatus (block B501). The display processor 302 and the stroke data generator 303 determines whether a handwriting input operation has been performed on the shared screen, based on whether an operation on the shared screen has been detected by, for example, the touch-screen display 17 (the digitizer 17C or the touch panel 17B). If no handwriting input operation has been performed (No in block B501), the processing proceeds to block B504.

If a handwriting input operation has been performed (Yes in block B501), the display processor 302 displays (draws) a stroke corresponding to the handwriting input operation on the shared screen (block B502). Furthermore, the stroke data generator 303 generates stroke data corresponding to the stroke, and the transmission controller 304 transmits the generated stroke data to a client or clients participating in the group (block B503).

Then, the reception controller 305 determines whether stroke data, which is transmitted from the client or clients participating in the group, has been received (block B504). If no stroke data has been received (No in block B504), the processing proceeds to block B507.

If the stroke data has been received (Yes in block B504), the display processor 302 displays (draws) a stroke corresponding to the received stroke data on the shared screen (block B505). Furthermore, the transmission controller 304 transmits the received stroke data to a client in the group, which is other than the client which transmits the stroke data (block B506).

Then, the opening module 312 determines whether to close the group (block B507). If it determines not to close the group (No in group B507), the processing returns to block 501, and it continues to open the group (i.e., execute the handwriting sharing service). If the opening module 312 determines to close the group (Yes in block B507), it notifies the client or clients in the group through the transmission controller 304 that the group will be closed (block B508), and ends the processing.

The flowchart of FIG. 35 shows an example of the procedure of sharing processing to be executed by the client apparatus will be explained.

First, the display processor 302 and the stroke data generator 303 determine whether a handwriting input operation has been performed on a shared screen displayed on a screen of the client apparatus (block B601). The display processor 302 and the stroke data generator 303 determine whether a handwriting input operation has been performed on the shared screen, based on whether an operation on the shared screen has been detected by, for example, the touchscreen display 17 (the digitizer 17C or the touch panel 17B). If no handwriting input operation has been performed (No in block B601), the processing proceeds to block B604.

If a handwriting input operation has been performed (Yes in block B601), the display processor 302 displays (draws) a stroke corresponding to the handwriting input operation on the shared screen (block B602). The stroke data generator 303 generates stroke data corresponding to the stroke, and the transmission controller 304 transmits the generated stroke data to the owner apparatus (block B603).

Next, the reception controller 305 determines whether stroke data transmitted from the owner apparatus has been received (block B604). If no stroke data has been received (No in block B604), the processing proceeds to block B606. If the stroke data has been received (Yes in block B604), the display processor 302 displays (draws) a stroke corresponding to the received stroke data on the shared screen (block 3605).

Then, the participation module 315 determines whether to exit from the group (block B606). If the participation module 315 determines not to exit from the group (No in block B606), the processing returns to block B601, and the client apparatus continues to participate in the group (i.e., to use the handwriting sharing service). If the participation module 315 determines to exit from the group (Yes in block B606), it notifies the owner apparatus that the client apparatus will exit from the group through a transmission controller 34 (block B607), and ends the processing.

Next, with reference to the flowchart of FIG. 36, an example of the procedure of a group management processing to be executed by the supervisor apparatus 10S will be explained.

First, the updating module 313 determines whether to update a thumbnail image displayed on the screen and indicating an opened group (block B701). The updating module 313 determines to update the thumbnail image, for example, if a button for instructing updating displayed on a screen of the supervisor apparatus 10S has been pressed (tapped). Alternatively, the updating module 313 may determine to update the thumbnail image if a given time has elapsed from the time at which the thumbnail image was updated last time. If the updating module 313 determines to update the thumbnail image (Yes in block B701), it executes updating processing in cooperation with the display processor 302, the transmission controller 304, the reception controller 305, etc. (block B702). The procedure of the updating processing will be described later with reference to FIG. 37.

If the updating module 313 determines not to update the thumbnail image (No in block B701), the collection module 314 determines whether to collect group shared data of the opened group (block B703). The collection module 314 determines to collect the group shared data, for example, if a button for instructing collection displayed on the screen has been pressed (tapped). Alternatively, the collection module 314 may determine to collect the group shared data if a given time has elapsed from the time at which the group shared data was collected last time. If the collection module 314 determines to collect the group shared data (Yes in block B703), it executes collection processing in cooperation with the display processor 302, the transmission controller 304, the reception controller 305, etc. (block B704). The procedure of the collection processing will be described later with reference to FIG. 38.

If the collection module 314 determines not to collect the group shared data (No in block B703), the participation module 315 determines whether to participate in the opened group (block B705). The participation module 315 determines to participate in the opened group, for example, if a thumbnail image displayed on the screen which indicates the group has been tapped. If the participation module 315 determines to participate in the group (Yes in block B705), it executes sharing processing in cooperation with the display processor 302, the stroke data generator 303, the transmission controller 304, the reception controller 305, etc. (block B706). The procedure of the sharing processing will be described later with reference to FIG. 39.

If the apparatus does not exit from the group (No in block B705), the processing returns to block B701, and it continues management processing for managing the opened group. Also, after updating processing, collection processing and sharing processing, the management processing for managing the opened group is continued.

The flowchart of FIG. 37 shows an example of the procedure of updating processing for updating a thumbnail image by the supervisor apparatus 10S.

First, the updating module 313 requests the owner apparatus to transmit a thumbnail image of a shared screen of the group through the transmission controller 304 (block B801). Then, the reception controller 305 receives from the owner apparatus the thumbnail image of the shared screen of the group (block B802). Using the received thumbnail image, the display processor 302 updates a corresponding thumbnail image displayed on the screen of the display 17A of the supervisor apparatus 10S (block B803).

Then, the updating module 313 determines whether another group a thumbnail image of which is to be updated is present (block B804). If another group a thumbnail image of which is to be updated is present (Yes in block B804), the processing returns to block B801, and processing for updating the thumbnail image of the other group is executed. If another group a thumbnail image of which is to be updated is not present (No in block B804), i.e., if thumbnail images of all opened groups are updated, the processing ends.

The flowchart of FIG. 38 shows an example of the procedure of collection processing of collecting shared data by the supervisor apparatus 10S.

First, the collection module 314 requests the owner apparatus of the group whose shared data to be collected, to permit the supervisor apparatus 10S to participate in the group through the transmission controller 304 (block B901). The collection module 314 receives the shared data of the group which is transmitted from the owner apparatus, through the reception controller 305 (block B902). The collection module 314 stores the received shared data in the storage medium 402 (the local database 12S) (block 3903).

Next, using the shared data, the display processor 302 updates a list of histories of groups displayed on the screen (block B905). On the screen of the supervisor apparatus 10S, the list of histories of groups is displayed. Using the received shared data, the display processor 302 may add a new item to the list, or may update a corresponding item of the list. Then, the collection module 314 notifies the owner apparatus that the supervisor apparatus 10S will exit from the group through the transmission controller 304 (block B905).

Furthermore, the collection module 314 determines whether another group whose shared data is to be collected is present (block B906). If another group whose shared data is to be collected is present (Yes in block B906), the processing returns to block B901, and processing for collecting the shared data of the other group is executed. If another group whose shared data is to be collected is not present (No in block B906), i.e., if collection of shared data of all opened groups is completed, the processing ends.

Figure 39:
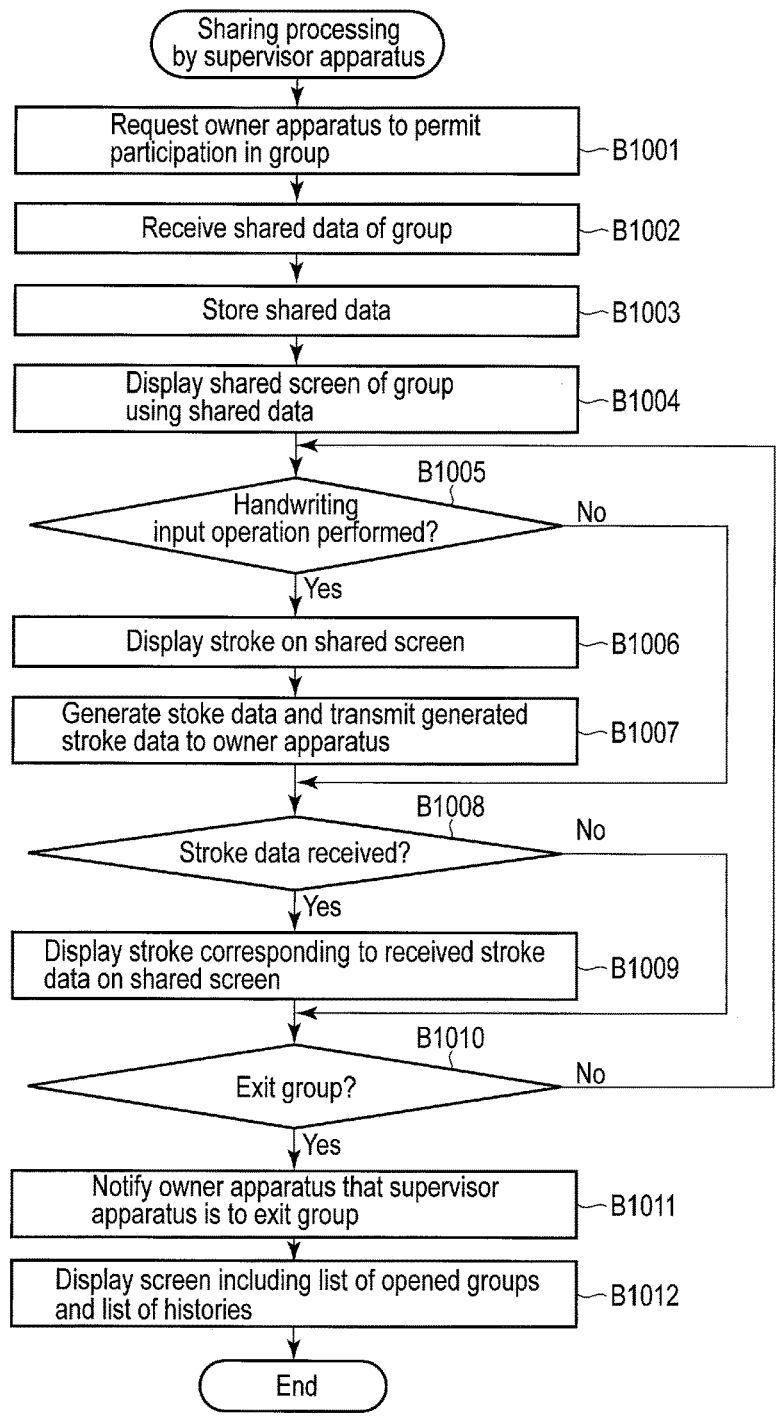
FIG. 39 is a flowchart showing an example of the procedure of sharing processing to be executed by the electronic apparatus of the embodiment.

The flowchart of FIG. 39 shows an example of the procedure of sharing processing by the supervisor apparatus 10S.

First, the participation module 315 requests the owner apparatus of the group to permit the supervisor apparatus 10S to participate in the group through the transmission controller 304 (block B1001). The participation module 315 receives shared data of the group which is transmitted from the owner apparatus, through the reception controller 305 (block B1002). The participation module 315 stores the received shared data in the storage medium 402 (the local database 12S) (block B1003). Using the received shared data, the display processor 302 displays a shared screen of the group on the screen of the supervisor apparatus 10S (block 1004).

Next, the display processor 302 and the stroke data generator 303 determine whether a handwriting input operation has been performed on the shared screen displayed on the screen (block B1005). To be more specific, the display processor 302 and the stroke data generator 303 determines whether a handwriting input operation has been performed on the shared screen, based on whether an operation on the shared screen has been detected by, for example, the touchscreen display 17 (the digitizer 17C or the touch panel 17B). If no handwriting input operation has been performed (No in block B1005), the processing proceeds to block B1008.

If a handwriting input operation has been performed (Yes in block B1005), the display processor 302 displays (draws) a stroke corresponding to the handwriting input operation on the shared screen displayed on the screen (block B1006). Furthermore, the stroke data generator 303 generates stroke data corresponding to the stroke, and the transmission controller 304 transmits the generated stroke data to the owner apparatus (block B1007).

Next, the reception controller 305 determines whether stroke data transmitted from the owner apparatus has been received (block B1008). If no stroke data has been received (No in block B1008), the processing proceeds to block B1010. If the stroke data has been received (Yes in block B1008), the display processor 302 displays (draws) a stroke corresponding to the received stroke data on the shared screen displayed on the screen (block B1009).

Then, the participation module 315 determines whether to exit from the group (block B1010). If the participation module 315 determines not to exit from the group (No in block B1010), the processing returns to block B1005, and continues to participate in the group (i.e., to use the handwriting sharing service). If the participation module 315 determines to exit from the group (Yes in block B1010), it notifies the owner apparatus through the transmission controller 34 that the supervisor apparatus 10S will exit from the group (block B1011). The display processor 302 changes the shared screen of the group being displayed to a screen including a list of thumbnail images of opened groups and a list of histories of the groups (block B1012).

As described above, according to the embodiment, the group sharing handwritten information can also be managed from the outside of the group. The reception controller 305 (receiver 1073) receives first handwriting shared in a first group according to a first scheme and second handwriting shared in a second group according to a second scheme. The first group includes a first user apparatus and a second user apparatus. The second group includes a third user apparatus and a fourth user apparatus. The first handwriting includes handwriting made on the first user apparatus and handwriting made on the second user apparatus, and the second handwriting includes handwriting made on the third user apparatus and handwriting made on the fourth user apparatus. The display processor 302 displays the first handwriting and the second handwriting on a screen of the LCD 17A. The making module 311 and the opening module 312 read first data 402B to be shared in the first group f, make a third group including the supervisor apparatus 10S and the first user apparatus, and share the first data in the third group according to a third scheme by transmitting the first data to the first user apparatus from the transmission controller 304 (transmitter 107A). The making module 311 and the opening module 312 read second data 402B to be shared in the second group, make a fourth group including the supervisor apparatus 10S and the third user apparatus, and share the second data in the fourth group according to a fourth scheme by transmitting the second data to the third user apparatus from the transmission controller 304 (transmitter 107A). By virtue of the above structure, the supervisor apparatus 10S according to the embodiment can manage the group without participating in the group by communicating with the first user apparatus executing the second service only when needed.

It should be noted that all the steps of the processing of the embodiment described with reference to the flowcharts of FIGS. 30 to 39 can be executed by software. Therefore, by installing a program for executing the processing steps in an ordinary computer and executing the program by means of a computer-readable storage medium which stores the program, the same advantages as those of the embodiment can be easily achieved.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus configured to communicate with a first user apparatus of three or more user apparatuses connected via a network and to operate as a supervisor apparatus that manages the three or more user apparatuses as a group, the electronic apparatus comprising:
   a controller; and
   a memory configured to store shared data for sharing handwriting information, wherein the controller is configured to:
      start a handwriting sharing service for managing a first group using the shared data;
      notify, when a group search request is received from the first user apparatus, the first user apparatus that the first group is opened;
      transmit, when the first user apparatus requests participation in the first group, the shared data to the first user apparatus;
      end, when an acknowledgement of receipt of the shared data is received from the first user apparatus, the handwriting sharing service for managing the first group; and
      cause the first user apparatus to start the handwriting sharing service for managing the first group to which the three or more user apparatuses belong using the shared data.

2. The electronic apparatus of claim 1, wherein the electronic apparatus is a tablet computer that has functions equivalent to those of the three or more user apparatuses.

3. The electronic apparatus of claim 1, wherein the controller is further configured to:
   receive, while the first user apparatus executes the handwriting sharing service for the first group, a thumbnail image of a canvas from the first user apparatus, the canvas being shared in the first group; and
   display the thumbnail image on a screen of a display in the electronic apparatus.

4. The electronic apparatus of claim 1, wherein the controller is further configured to receive, while the first user apparatus executes the handwriting sharing service for the first group, shared data shared in the first group from the first user apparatus.

5. The electronic apparatus of claim 4, wherein the controller is further configured to request the first user apparatus to participate in the first group and receive the shared data shared in the first group from the first user apparatus.

6. The electronic apparatus of claim 4, wherein the controller is further configured to display a canvas shared by the first group on a screen of a display in the electronic apparatus by using the shared data shared in the first group received from the first user apparatus.

7. The electronic apparatus of claim 6, wherein the controller is further configured to:
   display one or more strokes input by handwriting on the canvas on the display; and
   transmit one or more items of stroke data corresponding to the one or more strokes to the first user apparatus.

8. The electronic apparatus of claim 6, wherein the controller is further configured to:
   receive one or more items of stroke data corresponding to one or more strokes from the first user apparatus; and
   display one or more strokes corresponding to the received one or more items of stroke data on the canvas on the display.

9. The electronic apparatus of claim 4, wherein the controller is further configured to restart, after the first user apparatus ends the handwriting sharing service for the first group, the handwriting sharing service for the first group by using the shared data that is shared in the first group and is received from the first user apparatus.

10. A method of controlling an electronic apparatus that is configured to communicate with a first user apparatus of three or more user apparatuses connected via a network and to operate as a supervisor apparatus that manages the three or more user apparatuses as a group, the method comprising:
    starting a handwriting sharing service for managing a first group using the shared data;
    notifying, when a group search request is received from the first user apparatus, the first user apparatus that the first group is opened;
    transmitting, when the first user apparatus requests a participation in the first group, shared data for sharing handwriting information to the first user apparatus, the shared data being stored in a memory in the electronic apparatus;
    ending, when an acknowledgement of receipt of the shared data is received from the first user apparatus, the handwriting sharing service for managing the first group; and
    causing the first user apparatus to start the handwriting sharing service for managing the first group to which the three or more user apparatuses belong using the shared data.

11. The method of claim 10, further comprising:
    receiving, while the first user apparatus executes the handwriting sharing service for the first group, a thumbnail image of a canvas from the first user apparatus, the canvas being shared in the first group; and
    displaying the thumbnail image on a screen of a display in the electronic apparatus.

12. The method of claim 10, further comprising:
    receiving, while the first user apparatus executes the handwriting sharing service for the first group, shared data shared in the first group from the first user apparatus.

13. The method of claim 12, further comprising:
    requesting the first user apparatus to participate in the first group and receive the shared data shared in the first group from the first user apparatus.

14. The method of claim 12, further comprising:
    displaying a canvas shared in the first group on a screen of a display in the electronic apparatus by using the shared data shared in the first group received from the first user apparatus.

15. The method of claim 14, further comprising:
    displaying one or more strokes input by handwriting on the canvas on the display; and transmitting one or more items of stroke data corresponding to the one or more strokes to the first user apparatus.

16. The method of claim 14, further comprising:
receiving one or more items of stroke data corresponding to one or more strokes from the first user apparatus; and
displaying one or more strokes corresponding to the received one or more items of stroke data on the canvas on the display.

* * * * *